US011579872B2

(12) United States Patent
Barry et al.

(10) Patent No.: US 11,579,872 B2
(45) Date of Patent: Feb. 14, 2023

(54) VARIABLE-LENGTH INSTRUCTION BUFFER MANAGEMENT

(71) Applicant: Movidius Limited, Schiphol-Rijk (NL)

(72) Inventors: Brendan Barry, Dublin (IE); Fergal Connor, Dundalk (IE); Martin O'Riordan, Maynooth (IE); David Moloney, Dublin (IE); Sean Power, Cork (IE)

(73) Assignee: Movidius Limited, Schiphol-Rijk (NL)

( * ) Notice: Subject to any disclaimer, the term of this patent is extended or adjusted under 35 U.S.C. 154(b) by 0 days.

(21) Appl. No.: 16/797,881

(22) Filed: Feb. 21, 2020

(65) Prior Publication Data

US 2020/0192666 A1 Jun. 18, 2020

Related U.S. Application Data

(60) Division of application No. 15/382,467, filed on Dec. 16, 2016, now Pat. No. 10,572,252, which is a (Continued)

(30) Foreign Application Priority Data

Aug. 8, 2013 (GB) .................................... 1314263
Nov. 6, 2013 (RO) .................................... A/00812

(51) Int. Cl.
*G06F 9/30* (2018.01)
*G06F 9/38* (2018.01)
(Continued)

(52) U.S. Cl.
CPC .............. *G06F 9/3004* (2013.01); *G06F 1/32* (2013.01); *G06F 1/3203* (2013.01); (Continued)

(58) Field of Classification Search
CPC ............................ G06F 9/3001; G06F 9/3004
See application file for complete search history.

(56) References Cited

U.S. PATENT DOCUMENTS 4,281,312 A 7/1981 Knudson
4,626,825 A 12/1986 Burleson et al.
(Continued)

FOREIGN PATENT DOCUMENTS

CA 1236584 5/1988
CN 1078841 11/1993
(Continued)

OTHER PUBLICATIONS

European Patent Office, "Communication Pursuant to Article 94(3) EPC," mailed in connection with European Patent Application No. 18183679.2, dated Jul. 3, 2019, 4 pages.
(Continued)

*Primary Examiner* — William B Partridge
(74) *Attorney, Agent, or Firm* — Hanley, Flight & Zimmerman, LLC

(57) ABSTRACT

A vector processor is disclosed including a variety of variable-length instructions. Computer-implemented methods are disclosed for efficiently carrying out a variety of operations in a time-conscious, memory-efficient, and power-efficient manner. Methods for more efficiently managing a buffer by controlling the threshold based on the length of delay line instructions are disclosed. Methods for disposing multi-type and multi-size operations in hardware are disclosed. Methods for condensing look-up tables are disclosed. Methods for in-line alteration of variables are disclosed.

22 Claims, 14 Drawing Sheets

Related U.S. Application Data division of application No. 14/457,929, filed on Aug. 12, 2014, now Pat. No. 10,001,993, which is a continuation-in-part of application No. 14/082,396, filed on Nov. 18, 2013, now Pat. No. 9,934,043.

(60) Provisional application No. 62/030,913, filed on Jul. 30, 2014.

(51) Int. Cl.

| | |
|---|---|
| ***G06F 15/80*** | (2006.01) |
| ***G06F 1/3203*** | (2019.01) |
| ***G06F 1/32*** | (2019.01) |
| ***G06F 1/3234*** | (2019.01) |
| ***G06F 1/3287*** | (2019.01) |

(52) U.S. Cl.

CPC .......... *G06F 1/3243* (2013.01); *G06F 1/3287* (2013.01); *G06F 9/3001* (2013.01); *G06F 9/30032* (2013.01); *G06F 9/30036* (2013.01); *G06F 9/30058* (2013.01); *G06F 9/30072* (2013.01); *G06F 9/30149* (2013.01); *G06F 9/3804* (2013.01); *G06F 9/3816* (2013.01); *G06F 9/3822* (2013.01); *G06F 15/8053* (2013.01); *G06F 9/30* (2013.01); *Y02D 10/00* (2018.01)

(56) References Cited

U.S. PATENT DOCUMENTS

| | | | | |
|---|---|---|---|---|
| 4,680,730 | A | 7/1987 | Omoda et al. | |
| 4,783,841 | A | 11/1988 | Crayson | |
| 5,081,573 | A | 1/1992 | Hall et al. | |
| 5,155,843 | A | 10/1992 | Stamm et al. | |
| 5,226,171 | A | 7/1993 | Hall et al. | |
| 5,262,973 | A | 11/1993 | Richardson | |
| 5,333,296 | A | 7/1994 | Bouchard et al. | |
| 5,379,356 | A | 1/1995 | Purcell et al. | |
| 5,434,623 | A | 7/1995 | Coleman et al. | |
| 5,598,544 | A | 1/1997 | Ohshima | |
| 5,655,098 | A | 8/1997 | Witt et al. | |
| 5,689,672 | A | 11/1997 | Witt et al. | |
| 5,809,323 | A | 9/1998 | Eisen et al. | |
| 5,828,873 | A | 10/1998 | Lynch | |
| 5,835,392 | A * | 11/1998 | Dulong | G06F 17/142 708/404 |
| 5,861,873 | A | 1/1999 | Kikinis | |
| 5,881,260 | A | 3/1999 | Raje et al. | |
| 5,968,167 | A | 10/1999 | Whittaker et al. | |
| 6,173,389 | B1 | 1/2001 | Pechanek et al. | |
| 6,182,100 | B1 | 1/2001 | Schmookler | |
| 6,184,709 | B1 | 2/2001 | New | |
| 6,240,508 | B1 | 5/2001 | Brown, III et al. | |
| 6,275,921 | B1 | 8/2001 | Iwata et al. | |
| 6,304,605 | B1 | 10/2001 | Haikonen et al. | |
| 6,366,999 | B1 | 4/2002 | Drabenstott et al. | |
| 6,412,063 | B1 | 6/2002 | Samra | |
| 6,425,070 | B1 | 7/2002 | Zou et al. | |
| 6,467,036 | B1 | 10/2002 | Pechanek et al. | |
| 6,480,872 | B1 | 11/2002 | Choquette | |
| 6,523,110 | B1 | 2/2003 | Bright et al. | |
| 6,539,470 | B1 | 3/2003 | Mahurin et al. | |
| 6,577,316 | B2 | 6/2003 | Brethour et al. | |
| 6,591,019 | B1 | 7/2003 | Comair et al. | |
| 6,640,299 | B1 * | 10/2003 | Mang | G06F 9/3001 712/219 |
| 6,731,294 | B1 | 5/2004 | Mang et al. | |
| 6,760,831 | B2 | 7/2004 | Drabenstott et al. | |
| 6,839,728 | B2 | 1/2005 | Pitsianis et al. | |
| 6,851,041 | B2 | 2/2005 | Pechanek et al. | |
| 6,859,870 | B1 | 2/2005 | Kim et al. | |
| 6,948,087 | B2 | 9/2005 | Brethour et al. | |
| 6,954,842 | B2 | 10/2005 | Drabenstott et al. | |
| 7,019,674 | B2 * | 3/2006 | Cadambi | H04L 45/00 341/106 |
| 7,010,668 | B2 | 5/2006 | Drabenstott et al. | |
| 7,038,687 | B2 | 5/2006 | Booth, Jr. et al. | |
| 7,124,279 | B2 | 10/2006 | Topham | |
| 7,146,487 | B2 | 12/2006 | Drabenstott et al. | |
| 7,366,874 | B2 | 4/2008 | Seong et al. | |
| 7,343,471 | B2 | 5/2008 | Topham | |
| 7,376,813 | B2 * | 5/2008 | Sankaran | G06F 9/30032 712/208 |
| 7,409,530 | B2 | 8/2008 | Kim et al. | |
| 7,424,594 | B2 | 9/2008 | Pitsianis et al. | |
| 7,467,287 | B1 | 12/2008 | Bratt et al. | |
| 7,689,639 | B2 * | 3/2010 | Dent | G06F 9/3001 708/517 |
| 8,131,687 | B2 * | 3/2012 | Bates | G06F 16/1748 707/692 |
| 8,200,594 | B1 | 6/2012 | Bleiweiss | |
| 8,713,080 | B2 | 4/2014 | Moloney | |
| 8,990,171 | B2 * | 3/2015 | Kalach | G06F 16/1752 707/692 |
| 9,477,472 | B2 | 10/2016 | Macy, Jr. et al. | |
| 9,864,699 | B1 * | 1/2018 | Xu | G06F 12/1009 |
| 10,572,252 | B2 | 2/2020 | Barry et al. | |
| 2002/0161986 | A1 | 10/2002 | Kamigata et al. | |
| 2003/0005261 | A1 | 1/2003 | Sheaffer | |
| 2003/0149822 | A1 | 8/2003 | Scott et al. | |
| 2003/0154358 | A1 | 8/2003 | Seong et al. | |
| 2004/0101045 | A1 | 5/2004 | Yu et al. | |
| 2004/0133763 | A1 | 7/2004 | Mathur et al. | |
| 2004/0172521 | A1 | 9/2004 | Hooker et al. | |
| 2004/0260410 | A1 | 12/2004 | Sakamoto | |
| 2005/0036707 | A1 | 2/2005 | Matsuura | |
| 2005/0251644 | A1 | 11/2005 | Maher et al. | |
| 2005/0278502 | A1 | 12/2005 | Hundley | |
| 2006/0023429 | A1 | 2/2006 | Ribeiro et al. | |
| 2006/0050591 | A1 | 3/2006 | Park | |
| 2007/0030274 | A1 | 2/2007 | Woo | |
| 2007/0061389 | A1 | 3/2007 | Hussain | |
| 2007/0277021 | A1 | 11/2007 | O'Connor et al. | |
| 2007/0291571 | A1 | 12/2007 | Balasundaram | |
| 2008/0007562 | A1 | 1/2008 | Stuttard et al. | |
| 2008/0068389 | A1 | 3/2008 | Bakalash et al. | |
| 2009/0019257 | A1 | 1/2009 | Shen et al. | |
| 2009/0049264 | A1 | 2/2009 | Resnick | |
| 2009/0204837 | A1 | 8/2009 | Raval et al. | |
| 2009/0259708 | A1 | 10/2009 | Elmer et al. | |
| 2009/0319730 | A1 | 12/2009 | Tanaka et al. | |
| 2010/0165144 | A1 | 7/2010 | Lee | |
| 2010/0302413 | A1 | 12/2010 | Kawashima | |
| 2011/0145543 | A1 | 6/2011 | Damron | |
| 2012/0089824 | A1 | 4/2012 | Fukagawa | |
| 2012/0096445 | A1 | 4/2012 | Berg et al. | |
| 2012/0110267 | A1 | 5/2012 | Karkkainen et al. | |
| 2012/0124343 | A1 | 5/2012 | Kim et al. | |
| 2012/0216019 | A1 | 8/2012 | Bower et al. | |
| 2012/0293677 | A1 | 11/2012 | Ostrovsky | |
| 2012/0311360 | A1 | 12/2012 | Balasubramanian et al. | |
| 2012/0314946 | A1 | 12/2012 | Nomura et al. | |
| 2013/0116986 | A1 | 5/2013 | Zhang et al. | |
| 2014/0040909 | A1 | 2/2014 | Winser et al. | |
| 2014/0176569 | A1 | 6/2014 | Meixner | |
| 2014/0289498 | A1 | 9/2014 | Gonion | |
| 2014/0289502 | A1 | 9/2014 | Gonion | |
| 2014/0298068 | A1 | 10/2014 | Kosonocky et al. | |
| 2015/0046673 | A1 | 2/2015 | Barry et al. | |
| 2015/0058572 | A1 | 2/2015 | Olson et al. | |

FOREIGN PATENT DOCUMENTS

| | | | |
|---|---|---|---|
| CN | 1282024 | | 1/2001 |
| CN | 1326132 | | 12/2001 |
| CN | 1523491 | | 8/2004 |
| CN | 1620819 | A | 5/2005 |
| CN | 1625731 | | 6/2005 |
| CN | 101086680 | | 12/2007 |
| CN | 101268440 | | 9/2008 |
| CN | 101681258 | | 9/2008 |

(56) References Cited

FOREIGN PATENT DOCUMENTS

| | | | |
|---|---|---|---|
| CN | 102131038 | A | 7/2011 |
| CN | 102270112 | | 12/2011 |
| DE | 69228442 | | 9/1999 |
| DE | 2348971 | | 10/2000 |
| DE | 69519801 | | 6/2001 |
| DE | 69709078 | | 10/2002 |
| DE | 102007025948 | | 1/2008 |
| EP | 0240032 | | 10/1987 |
| EP | 0245027 | | 11/1987 |
| EP | 0380854 | | 8/1990 |
| EP | 1071010 | | 1/2001 |
| EP | 1158401 | | 11/2001 |
| EP | 1241892 | | 9/2002 |
| EP | 2567312 | | 3/2013 |
| ES | 2171919 | | 9/2002 |
| FI | 97096 | B | 6/1996 |
| FR | 2835934 | | 8/2003 |
| GB | 0710876 | | 6/1954 |
| GB | 1488538 | | 10/1977 |
| GB | 2311882 | | 10/1997 |
| GB | 2348971 | | 10/2000 |
| GB | 2362055 | | 11/2001 |
| GB | 2362733 | | 11/2001 |
| GB | 2366643 | | 3/2002 |
| JP | H01243126 | A | 9/1989 |
| JP | H1021074 | | 1/1998 |
| JP | 2000-029704 | | 1/2000 |
| JP | 2000112757 | | 4/2000 |
| JP | 03042969 | | 5/2000 |
| JP | 2002-007211 | | 1/2002 |
| JP | 2004013255 | | 1/2004 |
| JP | 2007-526536 | | 9/2007 |
| JP | 2008-277926 | | 11/2008 |
| JP | 2010282637 | | 12/2010 |
| WO | 9313628 | | 7/1993 |
| WO | 9608928 | | 3/1996 |
| WO | 9738372 | | 10/1997 |
| WO | 0022503 | | 4/2000 |
| WO | 0034887 | | 6/2000 |
| WO | 0045282 | | 8/2000 |
| WO | 0143074 | | 6/2001 |
| WO | 0184849 | | 11/2001 |
| WO | 2002510099 | | 6/2002 |
| WO | 2005091109 | | 9/2005 |
| WO | 2006117562 | | 11/2006 |
| WO | 200810634 | | 1/2008 |
| WO | 2008087195 | | 7/2008 |
| WO | 2010/067522 | | 6/2010 |

OTHER PUBLICATIONS

State Intellectual Property Office of China, "Notice on Grant of Patent Right," mailed in connection with Chinese Patent Application No. 2015580051186.6, dated May 7, 2019, 4 pages.

Japanese Patent Office, "Notice of Allowance," mailed in connection with Japanese Patent Application No. 2017-504804, dated Jan. 29, 2019, 6 pages.

Korean Intellectual Property Office, "Notice of Preliminary Rejection," mailed in connection with Korean Patent Application No. 10-2017-7005792, dated Apr. 22, 2019, 7 pages.

European Patent Office, "Extended European Search Report," mailed in connection with European Patent Application No. 18183679.2, dated Oct. 30, 2018, 6 pages.

State Intellectual Property Office of China, "Office Action," mailed in connection with Chinese Patent Application No. 2015580051186.6, dated Aug. 10, 2018, 20 pages.

"MIPS Instruction Coding," Feb. 19, 2009, 4 pages. Retrieved from http://www.cs.sunysb.edu/~lw/spim/MIPSinstHex.pdf.

United States Patent and Trademark Office, "Notice of Allowance," mailed in connection with U.S. Appl. No. 14/457,929, dated Feb. 14, 2018, 6 pages.

Wikipedia, "Delay Slot," Jul. 9, 2017, 3 pages. Retrieved from https://en.wikipedia.org/wiki/Delay_slot.

Zheng et al., "Architecture Design of a Variable Length Instruction Set VLIW DSP," Tsinshua Science and Technology, vol. 14, No. 5, Oct. 2009, pp. 561-569, 9 pages.

Alexander, "Evolution and Use of the VME Subsystem Bus—VSB," History of VMW Subsystem Buses, vol. 10, No. 6, Jul./Aug. 1986, pp. 307-312.

Dally et al., "Efficient Embedded Computing," Computer, IEEE Computer Society, Jul. 2008, pp. 27-32.

International Searching Authority, "International Search Report and Written Opinion," mailed in connection with International Patent Application No. PCT/IB2015/001805, dated May 11, 2016, 16 pages.

International Searching Authority, "International Search Report and Written Opinion," mailed in connection with International Patent Application No. PCT/IB2014/002541, dated Jul. 20, 2015, 14 pages.

International Searching Authority, "International Search Report and Written Opinion," mailed in connection with International Patent Application No. PCT/IB2014/003059, dated May 11, 2015, 10 pages.

International Searching Authority, "International Search Report and Written Opinion," mailed in connection with International Patent Application No. PCT/IB2015/001845, dated Jan. 8, 2016, 13 pages.

International Searching Authority, "International Search Report and Written Opinion," mailed in connection with International Patent Application No. PCT/IB2014/003104, dated Jun. 25, 2015, 10 pages.

Kahle et al., "Introduction to the Cell Multiprocessor," IBM J. Res. & Dev., vol. 49, No. 4/5, Jul./Sep. 2005, pp. 589-604.

Young, "Code Scheduling Methods for Some Architectural Features in Pipe," Microprocessing and Microprogramming, vol. 22, No. 1, Jan. 1, 1988, pp. 39-63.

Japanese Patent Office, "Notice of Reasons for Rejection," mailed in connection with Japanese Patent Application No. 2019-035945, dated Jan. 28, 2019, 15 pages.

United States Patent and Trademark Office, "Non-final Office Action," mailed in connection with U.S. Appl. No. 15/382,467, dated Apr. 26, 2018, 13 pages.

United States Patent and Trademark Office, "Notice of Allowance," mailed in connection with U.S. Appl. No. 15/382,467, dated Oct. 2, 2019, 8 pages.

United States Patent and Trademark Office, "Notice of Allowance," mailed in connection with U.S. Appl. No. 15/382,467, dated Oct. 2, 2019, 7 pages.

United States Patent and Trademark Office, "Final Office Action," mailed in connection with U.S. Appl. No. 15/382,467, dated Sep. 19, 2018, 18 pages.

United States Patent and Trademark Office, "Non-final Office Action," mailed in connection with U.S. Appl. No. 15/382,467, dated Apr. 26, 2018, 14 pages.

Indian Patent Office, "Examination Report," mailed in connection with Indian Patent Application No. 201747002615, dated Aug. 26, 2020, 8 pages.

Brazilian National Institute of Industrial Property, "Office Action," mailed in connection with Brazilian Patent Application No. 112017001981-7, dated Aug. 18, 2020, 4 pages.

Japanese Patent Office, "Decision to Refuse," mailed in connection with Japanese Patent Application No. 2019-035945, dated Aug. 21, 2020, 8 pages.

Korean Intellectual Property Office, "Notice of Preliminary Rejection," mailed in connection with Korean Patent Application No. 10-2020-7000089, dated Dec. 21, 2020, 4 pages.

European Patent Office, "Communication Pursuant to Article 94(3) EPC," mailed in connection with European Patent Application No. 18183679.2, dated Feb. 9, 2021, 4 pages.

Notification of Reason for Refusal issued by the Korean Intellectual Property Office in corresponding Korean Patent Application No. 10-2021-7016084, dated Sep. 9, 2021 (9 pages including partial English translation).

Rahman: "Xeon Phi Vector Architecture and Instruction Set," from Intel Xeon Phi Architecture and Tools, Chapter 3, Sep. 2013, pp. 31-47.

(56) References Cited

OTHER PUBLICATIONS

No Author Listed: "Chimera™: The NVIDIA Computational Photography Architecture", NVIDIA Corporation, pp. 1-15, Mar. 2013.
Rosten et al.: "Machine learning for high-speed corner detection," Department of Engineering, Cambridge University, UK, 9th European Conference on Computer Vision, Graz, Austria, May 7-13, 2006, pp. 1-14.
No Author Listed: "x86 instruction listings," retrieved from Wikipedia, Apr. 20, 2018, pp. 1-15.
Korean Intellectual Property Office "Notice of Allowance" mailed in connection with Korean Application No. 10-2021-7016084, dated Mar. 21, 2022, 3 pages. (Non-English; submitted for the purpose of identifying the references cited on the bottom of p. 1 of the document).
Japanese Patent Office "Office Action" mailed in connection with Japanese Application No. 2020-217605, dated Oct. 26, 2021, 12 pages.
Korean Intellectual Property Office "Notice of Allowance" mailed in connection with Korean Application No. 10-2020-7000089, dated Feb. 26, 2021,2 pages. (Non-English; submitted for the purpose of identifying reference cited on on the bottom of p. 1 of the document).
No Author Listed: "Intel 64 and IA-32 Architectures Optimization Reference Manual," Intel, Mar. 2014, 660 pages. (The relevance of this reference is provided by the Korean Office correspondence dated Sep. 9, 2021, which was previously submitted in an IDS dated Jan. 20, 2022, and identified as considered by the Examiner.).
Williamson: "Arm Cortex A8: A High Performance Processor for Low Power Applications," in Unique Chips and Systems, John and Rubio Eds., CRC Press, published Nov. 15, 2007, pp. 1-23.
Pan: "High Performance, Variable-Length Instruction Encodings," Department of Electrical Engineering and Computer Science, Massachusetts Institute of Technology, May 24, 2002, pp. 1-53.
No Author Listed: "Variable-Length Encoding (VLE) extension programming interface manual," UM0438 User manual, STMicroelectronics, Jul. 2007, pp. 1-50.
European Patent Office "Communication Pursuant to Article 94(3) EPC" mailed in connection with European Application No. 18183679.2, dated Apr. 20, 2022, 4 pages.
Japanese Patent Office "Decision to Refuse" mailed in connection with Japanese Application No. 2020-217605, dated Apr. 26, 2022, 10 pages.
Korean Intellectual Property Office "Notice of Preliminary Rejection" mailed in connection with Korean Application No. 10-2022-7021273, dated Aug. 20, 2022, 8 pages.
Brazilian Patent Office "Office Action" mailed in connection with Brazil Application No. BR112017001981-7, dated Aug. 31, 2022, 10 pages.
European Patent Office, "Extended European Search Report," mailed in connection with European Application No. 22192673.6, dated Dec. 12, 2022, 7 pages.
Chinese Patent Office, "First Office Action," mailed in connection with Chinese Application No. 201910648783.7, dated Nov. 23, 2022, 27 pages. Machine translation included.

* cited by examiner

<table>
<tr><th>1.f</th><th>Fixed-point representation of log2(1.f) to required accuracy.</th><th>Alternative encoding <level>|<run>|<rest></th></tr>
<tr><td>1.0000000001</td><td>0.000000000101110001001</td><td>0|1001|01110001001</td></tr>
<tr><td>1.1000000000</td><td>0.1001010111000</td><td>1|0001|01010111000</td></tr>
<tr><td>1.1111111111</td><td>0.111111111101000111010 0</td><td>1|1010|10001110100</td></tr>
</table>

FIG. 10

VARIABLE-LENGTH INSTRUCTION BUFFER MANAGEMENT

CROSS-REFERENCE TO RELATED APPLICATIONS

This is patent arises from a divisional of U.S. patent application Ser. No. 15/382,467, entitled "VARIABLE-LENGTH INSTRUCTION BUFFER MANAGEMENT," filed on Dec. 16, 2016, which is a divisional of U.S. patent application Ser. No. 14/457,929, entitled "VARIABLE-LENGTH INSTRUCTION BUFFER MANAGEMENT," filed on Aug. 12, 2014, which is a continuation-in-part of U.S. patent application Ser. No. 14/082,396, entitled "APPARATUS, SYSTEMS, AND METHODS FOR PROVIDING COMPUTATIONAL IMAGING PIPELINE," filed on Nov. 18, 2013, which claims priority to the Romanian Patent Application OSIM Registratura A/00812, entitled "APPARATUS, SYSTEMS, AND METHODS FOR PROVIDING CONFIGURABLE AND COMPOSABLE COMPUTATIONAL IMAGING PIPELINE," filed on Nov. 6, 2013, and to the U.K. Patent Application No. GB1314263.3, entitled "CONFIGURABLE AND COMPOSABLE COMPUTATIONAL IMAGING PIPELINE," filed on Aug. 8, 2013. U.S. patent application Ser. No. 14/457,929 also claims the benefit of U.S. Provisional Patent Application Ser. No. 62/030,913, entitled "LOW POWER COMPUTATIONAL IMAGING COMPUTING DEVICE," filed on Jul. 30, 2014. Each one of the applications identified in this paragraph is hereby incorporated by reference herein in its entirety.

FIELD OF THE APPLICATION

This present application relates generally to computer vision processing, and more specifically for an efficient lower-power vector processor.

BACKGROUND

Computational imaging is a new imaging paradigm that is capable of providing unprecedented user-experience and information based on images and videos. For example, computational imaging can process images and/or videos to provide a depth map of a scene, provide a panoramic view of a scene, extract faces from images and/or videos, extract text, features, and metadata from images and/or videos, and even provide automated visual awareness capabilities based on object and scene recognition features.

While computational imaging can provide interesting capabilities, it has not been widely adopted. The slow adoption of computational imaging can be attributed to the fact that computational imaging comes with fundamental data processing challenges. Oftentimes, image resolution and video frame rates are high. Therefore, computational imaging generally requires hundreds of gigaflops of computational resources, which may be difficult to obtain using regular computer processors, especially where that performance has to be sustainable and backed up by high memory bandwidth at low power dissipation. Furthermore, computational imaging is generally sensitive to latency. Because users are unlikely to wait several minutes for a camera to recognize an object, computational imaging cameras are generally designed to process images and videos quickly, which further burdens the computational requirement of computational imaging.

Unfortunately, it is difficult to implement computational imaging techniques in customized hardware. As the field of computational imaging is in its relative infancy, implementation techniques are in constant flux. Therefore, it is difficult to customize computational imaging entirely in hardware as changes to implementation techniques would require redesigning the entire hardware. Accordingly, it is generally desirable to provide a flexible hardware architecture and a flexible hardware infrastructure.

At the same time, the demand for such video and image processing is coming to a large extent from portable electronic devices, for example tablet computers and mobile devices, where power consumption is a key consideration. As a result, there is a general need for a flexible computational imaging infrastructure that can operate even under a constrained power budget.

SUMMARY

In accordance with the disclosed subject matter, systems and methods are provided for a vector processor for low power computational imaging.

Disclosed subject matter includes a computer-implemented method for managing a variable-length instruction buffer, which can include the steps of: caching variable-length instruction data from a first reference location; comparing a first level of unprocessed data available in an instruction buffer at a first time to a default threshold; loading a fixed width of data from the cached instruction data into the instruction buffer based on the first level of unprocessed data not satisfying the default threshold; processing a branching instruction referencing a second reference location different from the first reference location, the branching instruction including a header indicating a branch delay size; comparing a second level of unprocessed data available in the instruction buffer at a second time after the branching instruction is processed to the branch delay size; and loading a fixed width of data from the cached instruction data into the buffer based on the second level of unprocessed data not satisfying the branch delay size.

In some embodiments, the method can further include decoupling a variable-length instruction from the unprocessed data in the buffer and outputting the decoupled instruction, reducing the level of unprocessed data in the buffer. The decoupled instruction is output to a vector processor.

Disclosed subject matter also includes a system for managing variable-length instructions, including a cache for storing variable-length instructions from memory, a buffer for decoupling data loaded from the cache into instructions, and a fetch unit. The cache is configured to load instructions from a particular memory location. The buffer is configured to receive fixed-width data lines from the cache and output variable-length instructions. The fetch unit is configured to determine a level of unprocessed data in the buffer; instruct the cache to load additional data into the buffer compare a first level of unprocessed data available in the buffer at a first time to a default threshold to determine when to instruct the cache to load additional data into the buffer; after the system identifies a branching instruction, determine a branch delay size from the branching instruction header; and compare a second level of unprocessed data available in the buffer at a second time after the system identifies the branching instruction to the branch delay size instead of the default threshold to determine when to instruct the cache to load additional data into the buffer.

Disclosed subject matter also includes a computer-implemented method for hardware processing of data, which can include the steps of: receiving a first variable-length instruction, the instruction indicating a first operation to perform and referencing one or more first operands; determining a first data type for the one or more first operands; performing the first operation on the first operands of the first data type using a first hardware logic circuit; receiving a second variable-length instruction, the instruction indicating to perform the first operation and referencing one or more second operands; determining a second data type for the one or more second operands, wherein the second data type is different from the first data type; and performing the first operation on the second operands of the second data type using the first hardware logic. The first hardware logic can be operable to perform the first operation on operands of multiple sizes. The first hardware logic can be operable to perform the first operation on operands of floating point, fixed point, integer, and scaled integer data types.

Disclosed subject matter also includes a computer-implemented method which can include the steps of: storing a look-up table of results entries for an operation, the look-up table including fractional results at a predetermined level of precision, wherein the look-up table includes, for each entry, a plurality of encoded bits and a plurality of unencoded bits; in response to an instruction including the operation, looking up a particular entry corresponding to a particular value on the look-up table; decoding the encoded bits to generate a part of the fractional result; adding at least the unencoded bits to the generated fractional result; and returning the result of the operation based on the generated fractional result. The operation can be a unitary operation such as a logarithmic operation.

In some embodiments, encoded bits can represent a number of times to repeat a particular digit in the fractional result. The particular digit can be stored in the look-up table entry. Alternatively, the particular digit can be not stored in the look-up table entry and the method can further include comparing the particular value to a threshold value in order to determine the particular digit.

Disclosed subject matter also includes a computer-implemented method for in-line vector alteration, which can include the steps of: receiving a variable-length instruction including an operation to be performed on an altered form of a vector referenced at a first memory location; generating an altered vector as specified by the variable-length instruction; and performing the operation on the altered vector. After the operation is performed, the vector at the first memory location is in its original unaltered form. The alteration can include swizzled vector elements, inverted vector elements, and/or substituted values for vector elements. At least one vector element can be both swizzled and inverted.

In accordance with another embodiment, an article of manufacture is disclosed including at least one processor readable storage medium and instructions stored on the at least one medium. The instructions can be configured to be readable from the at least one medium by at least one processor and thereby cause the at least one processor to operate so as to carry out any and all of the steps in any of the above embodiments.

In accordance with another embodiment, the techniques may be realized as a system comprising one or more processors communicatively coupled to a network; wherein the one or more processors are configured to carry out any and all of the steps described with respect to any of the above embodiments.

The present invention will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

DESCRIPTION OF DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

FIG. 10 is a chart illustrating entries of a compressed look-up table in accordance with some embodiments.

DETAILED DESCRIPTION

Vector Engine Architecture

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Computational imaging can transform the ways in which machines capture and interact with the physical world. For example, via computational imaging, machines can capture images that were extremely difficult to capture using traditional imaging techniques. As another example, via computational imaging, machines can understand their surroundings and react in accordance with their surroundings.

One of the challenges in bringing computational imaging to a mass market is that computational imaging is inherently computationally expensive. Computational imaging often uses a large number of images at a high resolution and/or a large number of videos with a high frame rate. Therefore, computational imaging often needs the support of powerful computing platforms. Furthermore, because computational imaging is often used in mobile settings, for example, using a smart phone or a tablet computer, computational imaging often needs the support of powerful computing platforms that can operate at a low power budget.

Figure 1:
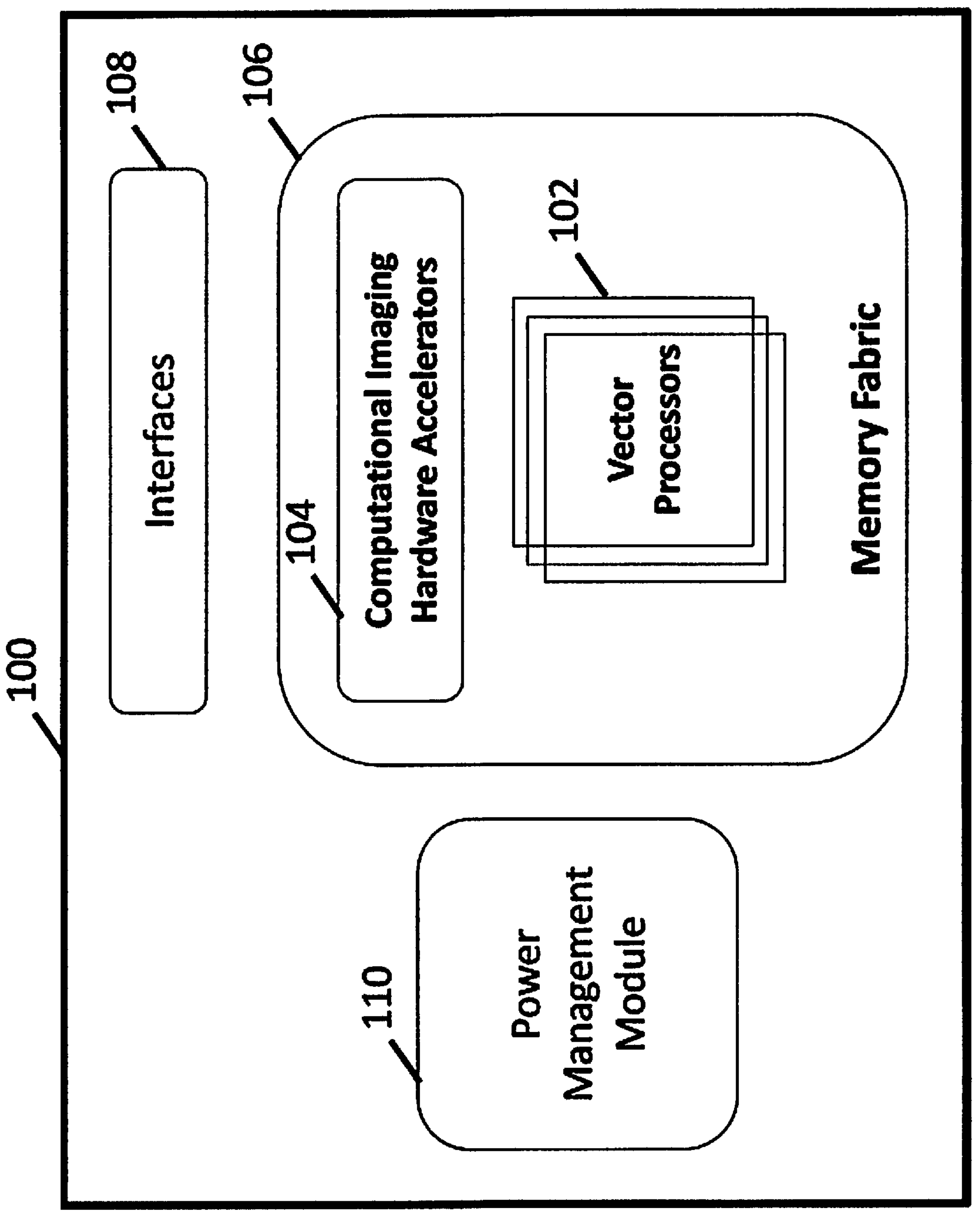
FIG. 1 provides a high level illustration of a computing device in accordance with some embodiments.

The present application discloses a computing device that can provide a low-power, highly capable computing platform for computational imaging, and identifies particular features of a vector processor that can contribute to the capabilities of the platform. FIG. 1 provides a high level illustration of a computing device in accordance with some embodiments. The computing device 100 can include one or more processing units, for example one or more vector processors 102 and one or more hardware accelerators 104, an intelligent memory fabric 106, a peripheral device 108, and a power management module 110.

The one or more vector processors 102 includes a central processing unit (CPU) that implements an instruction set containing instructions that operate on an array of data called vectors. More particularly, the one or more vector processors 102 can be configured to perform generic arithmetic operations on a large volume of data simultaneously. In some embodiments, the one or more vector processors 102 can include a single instruction multiple data, very long instruction word (SIMD-VLIW) processor. In some embodiments, the one or more vector processors 102 can be designed to execute instructions associated with computer vision and imaging applications.

The one or more hardware accelerators 104 includes computer hardware that performs some functions faster than is possible in software running on a more general-purpose CPU. Examples of a hardware accelerator in non-vision applications include a blitting acceleration module in graphics processing units (GPUs) that is configured to combine several bitmaps into one using a raster operator.

In some embodiments, the one or more hardware accelerators 104 can provide a configurable infrastructure that is tailored to image processing and computer vision applications. The hardware accelerators 104 can be considered to include generic wrapper hardware for accelerating image processing and computer vision operations surrounding an application-specific computational core. For example, a hardware accelerator 104 can include a dedicated filtering module for performing image filtering operations. The filtering module can be configured to operate a customized filter kernel across an image in an efficient manner. In some embodiments, the hardware accelerator 104 can output one fully computed output pixel per clock cycle.

The intelligent memory fabric 106 can be configured to provide a low power memory system with small latency. Because images and videos include a large amount of data, providing a high-speed interface between memory and processing units is important. In some embodiments, the intelligent memory fabric 106 can include, for example, 64 blocks of memory, each of which can include a 64-bit interface. In such embodiments, the memory fabric 106 operating at 600 MHz, for example, is capable of transferring data at 307.2 GB/sec. In other embodiments, the intelligent memory fabric 106 can include any other number of blocks of memory, each of which can include any number of interfaces implementing one or more interface protocols.

The peripheral device 108 can be configured to provide a communication channel for sending and receiving data bits to and from external devices, such as an image sensor and an accelerometer. The peripheral device 108 can provide a communication mechanism for the vector processors 102, the hardware accelerators 104, and the memory fabric 106 to communicate with external devices.

The power management module 110 can be configured to control activities of designated blocks within the computing device 100. More particularly, the power management module 110 can be configured to control the power supply voltage of designated blocks, also referred to as power islands, within the computing device 100. For example, when the power management module 110 enables a power supply of a power island, the computing device 100 can be triggered to provide an appropriate power supply voltage to the power island. In some embodiments, each power island can include an independent power domain. Therefore, the power supply of power islands can be controlled independently. In some embodiments, the power management module 110 can also be configured to control activities of power islands externally attached to the computing device 100 via one or more of input/output pins in the computing device 100.

Figure 2:
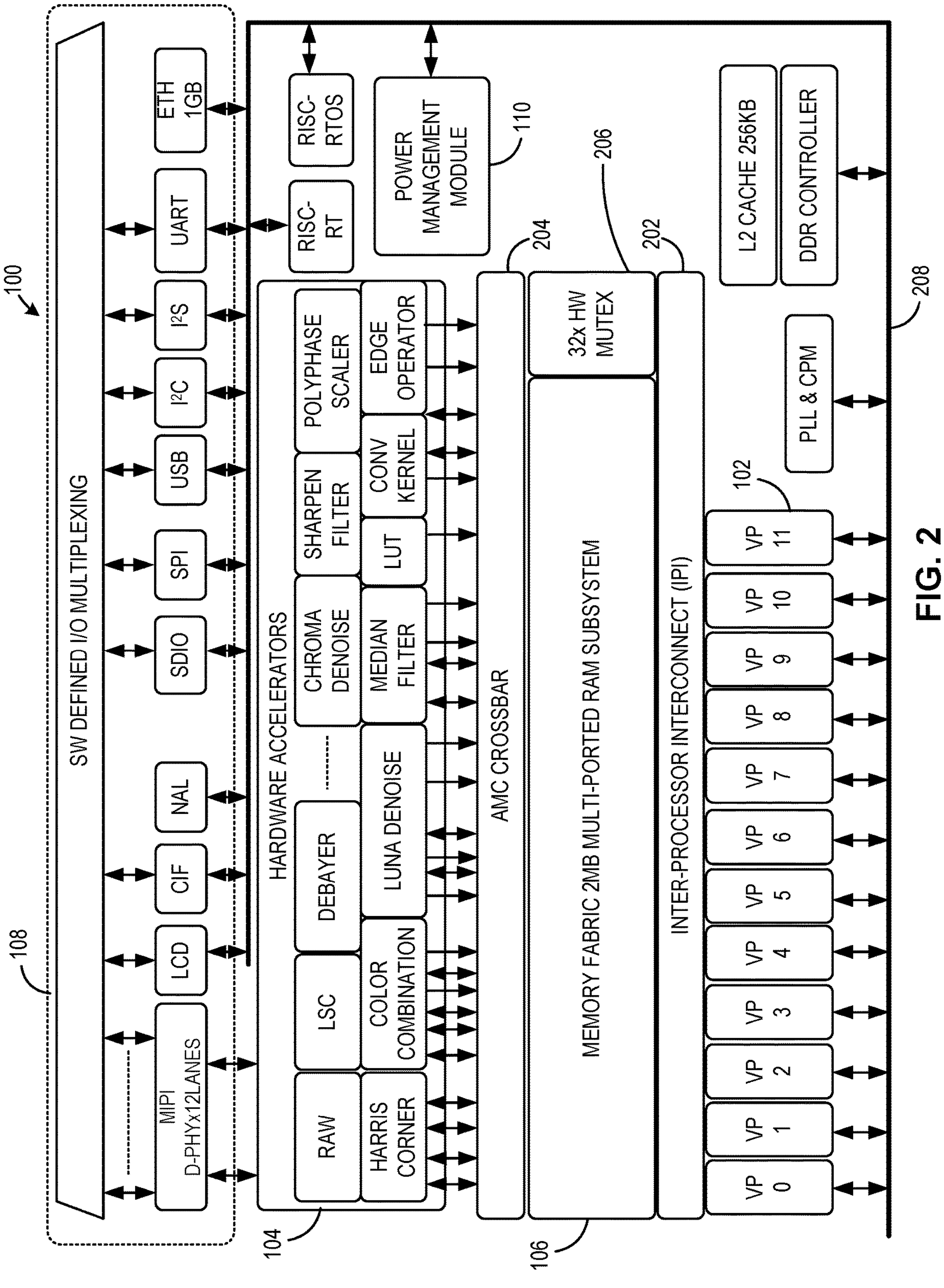
FIG. 2 illustrates a detailed illustration of a computing device in accordance with some embodiments.

FIG. 2 illustrates a detailed illustration of a computing device in accordance with some embodiments. The computing device 100 can include a plurality of vector processors 102. In this illustration, the computing device 100 includes 12 vector processors 102. The vector processors 102 can communicate with one another via the inter-processor interconnect (IPI) 202. The vector processors 102 can also communicate with other components in the computing device 100, including the memory fabric 106 and/or hardware accelerators 104, via the IPI 202 and the Accelerator Memory Controller (AMC) crossbar 204 or a memory-mapped processor bus 208.

In some embodiments, the one or more vector processors 102 can be designed to execute a proprietary instruction set. The proprietary instruction set can include a proprietary instruction. The proprietary instruction can be a variable length binary string that includes an instruction header and one or more unit instructions. The instruction header can include information on the instruction length and the active units for the associated proprietary instruction; the unit instruction can be a variable length binary string that includes a number of fields that are either fixed or variable. The fields in the unit instruction can include an opcode that identifies the instruction and an operand that specifies the value use in the unit instruction execution.

The computing device 100 can include hardware accelerators 104. The hardware accelerators 104 can include a variety of accelerator modules that are configured to perform predefined processing functions. In some embodiments, a predefined processing function can include a filtering operation. For example, the hardware accelerators 104 can include a raw image processing module, a lens shading correction (LSC) module, a bayer pattern demosaicing module, a sharpen filter module, a polyphase scaler module, a Harris corner detection module, a color combination module, a luma channel denoise module, a chroma channel denoise module, a median filter module, a look-up table, a convolution module, an edge detection module, and/or any other suitable module or combination of modules. The hardware accelerators 104 can be configured to retrieve and store data in memory devices residing in the memory fabric 106.

The memory fabric 106 can include a central memory system that coordinates memory operations within the computing device 100. The memory fabric 106 can be designed to reduce unnecessary data transfer between processing units, such as vector processors 102 and hardware accelerators 104. The memory fabric 106 is constructed to allow a plurality of processing units to access, in parallel, data and program code memory without stalling. Additionally, the memory fabric 106 can make provision for a host processor to access the memory system in the memory fabric 106 via a parallel bus such as the Advanced eXtensible Interface (AXI) or any other suitable bus 208.

In some embodiments, a processing unit can read/write up to 128-bits per cycle through its load-store unit (LSU) ports and read up to 128 bit program code per cycle through its instruction port. In addition to IPI 202 and AMC 204 interfaces for processors 102 and hardware accelerators 104, respectively, the memory fabric 106 can provide simultaneous read/write access to a memory system through the Advanced Microcontroller Bus Architecture (AMBA) High-performance Bus (AHB) and AXI bus interfaces. The AHB and AXI are standard parallel interface buses which allow processing units, a memory system, and a peripheral device to be connected using a shared bus infrastructure. Any other suitable buses can be used. In some embodiments, the memory fabric 106 can be configured to handle a peak of 18×128-bit memory accesses per clock cycle. In other embodiments, the memory fabric 106 can be designed to handle any number of memory accesses per clock cycle using a high-speed interface with a large number of bits.

A memory system in the memory fabric 106 can include a plurality of memory slices, each memory slice being associated with one of the vector processors 102 and giving preferential access to that processor over other vector processors 102. Each memory slice can include a plurality of Random Access Memory (RAM) tiles, where each RAM tile can include a read port and a write port. In some cases, each memory slice may be provided with a memory slice controller for providing access to a related memory slice.

The processors and the RAM tiles can be coupled to one another via a bus, also referred to as an IPI 202. In some cases, the IPI 202 can couple any of the vector processors 202 with any of the memory slices in the memory fabric 106. Suitably, each RAM tile can include a tile control logic block for granting access to the tile. The tile control logic block is sometimes referred to as tile control logic or an arbitration block.

In some embodiments, each memory slice can include a plurality of RAM tiles or physical RAM blocks. For instance, a memory slice having the size of 128 kB can include four 32 kB single-ported RAM tiles (e.g., physical RAM elements) organized as 4 k×32-bit words. As another instance, a memory slice having a size of 256 kB can include eight 32 kB single-ported RAM tiles (e.g., physical RAM elements) organized as 8 k×32-bit words. In some embodiments, the memory slice can have a capacity as low as 16 kB and as high as 16 MB. In other embodiments, the memory slice can be configured to have as much capacity as needed to accommodate a variety of applications handled by the computing device.

In some embodiments, a RAM tile can include a single ported complementary metal-oxide-semiconductor (CMOS) RAM. The advantage of a single ported CMOS RAM is that it is generally available in most semiconductor processes. In other embodiments, a RAM tile can include a multi-ported CMOS RAM. In some embodiments, each RAM tile can be 16-bit wide, 32-bit wide, 64-bit wide, 128-bit wide, or can be as wide as needed by the particular application of the computing device.

The use of single-ported memory devices can increase the power and area efficiency of the memory subsystem but can limit the bandwidth of the memory system. In some embodiments, the memory fabric 106 can be designed to allow these memory devices to behave as a virtual multi-ported memory subsystem capable of servicing multiple simultaneous read and write requests from multiple sources (processors and hardware blocks). This can be achieved by using multiple physical RAM instances and providing arbitrated access to them to service multiple sources.

In some embodiments, each RAM tile can be associated with tile control logic. The tile control logic is configured to receive requests from vector processors 102 or hardware accelerators 104 and provide access to individual read and write-ports of the associated RAM tile. For example, when a vector processor 102 is ready to access data in a RAM tile, before the vector processor 102 sends the memory data request to the RAM tile directly, the vector processor 102 can send a memory access request to the tile control logic associated with the RAM tile. The memory access request can include a memory address of data requested by the processing element. Subsequently, the tile control logic can analyze the memory access request and determine whether the vector processor 102 can access the requested RAM tile. If the vector processor 102 can access the requested RAM tile, the tile control logic can send an access grant message to the vector processor 102, and subsequently, the vector processor 102 can send a memory data request to the RAM tile.

In some embodiments, the tile control logic can be configured to determine and enforce an order in which many processing units (e.g., vector processors and hardware accelerators) access the same RAM tile. For example, the tile control logic can include a clash detector, which is configured to detect an instance at which two or more processing units attempt to access a RAM tile simultaneously. The clash detector can be configured to report to a runtime scheduler that an access clash has occurred and that the access clash should be resolved.

The memory fabric 106 can also include a memory bus for transferring data bits from memory to vector processors 102 or hardware accelerators 104, or from vector processors 102 or hardware accelerators 104 to memory. The memory fabric 106 can also include a direct memory access (DMA) controller that coordinates the data transfer amongst vector processors 102, hardware accelerators 104, and memory.

The peripheral device 108 can be configured to provide a communication channel for sending and receiving data bits to and from external devices, such as multiple heterogeneous image sensors and an accelerometer. The peripheral device 108 can provide a communication mechanism for the vector processors 102, the hardware accelerators 104, and the memory fabric 106 to communicate with external devices.

Traditionally, the functionality of a peripheral device has been fixed and hard-coded. For example, mobile industry processor interface (MIPI) peripherals were only able to interface with an external device that also implements lower-rate digital interfaces such as the SPI, I2C, I2S, or any other suitable standards.

However, in some embodiments of the present disclosure, the functionality of the peripheral device 108 may be defined using software. More particularly, the peripheral device 108 can include an emulation module that is capable of emulating the functionality of standardized interface protocols, such as SPI, I2C, I2S, or any other suitable protocol.

The power management module 110 is configured to control activities of blocks within the computing device 100. More particularly, the power management module 110 is configured to control the power supply voltage of designated blocks, also referred to as power islands. For example, when the power management module 110 enables a power supply of a power island, the computing device 100 is configured to provide an appropriate power supply voltage to the power island. The power management module 110 can be configured to enable a power supply of a power island by applying an enable signal in a register or on a signal line on a bus. In some embodiments, the power management module 110 can also be configured to control activities of external device via one or more of input/output pins in the computing device 100.

In some embodiments, a power island can be always powered-on (e.g., the power supply voltage is always provided to the power island.) Such a power island can be referred to as an always-on power island. In some embodiments, the always-on power-island can be used to monitor signals from, for example, General-Purpose-Input-Output (GPIO) pins, external interfaces, and/or internal functional blocks such as a low frequency timer or power-on reset. This way, the computing device 100 can respond to an event or a sequence of events and adaptively power-up only the power-islands that are needed to respond to the event or the sequence of events.

Further details regarding the hardware accelerators 104, memory fabric 106, peripheral devices 108, and power management module 110 are provided in U.S. patent application Ser. No. 14/458,014, entitled "LOW POWER COMPUTATIONAL IMAGING," identified by an, and U.S. patent application Ser. No. 14/458,052, entitled "APPARATUS, SYSTEMS, AND METHODS FOR LOW POWER COMPUTATIONAL IMAGING." Both of these applications are filed on an even date herewith and are herein incorporated by reference in their entirety.

Figure 3:
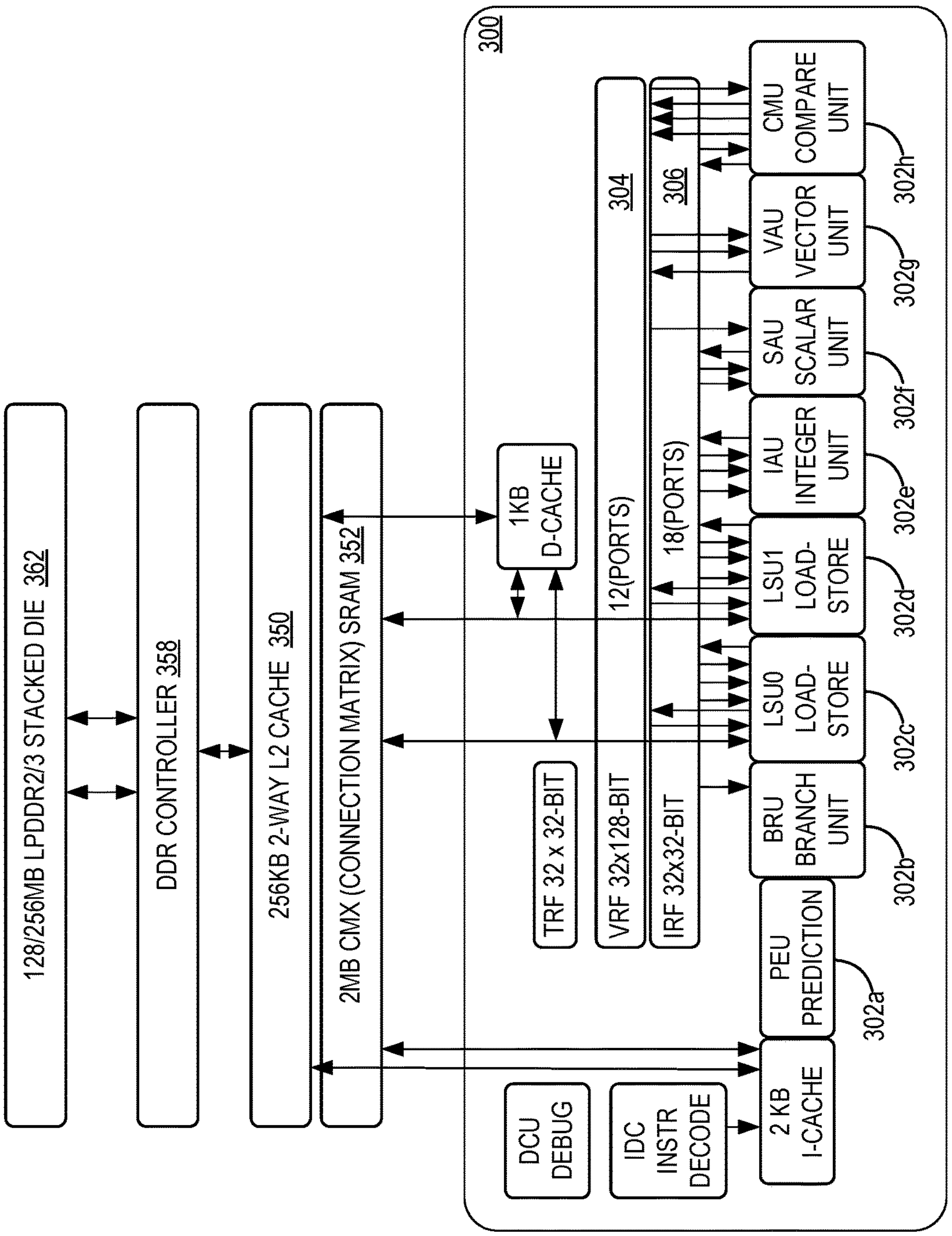
FIG. 3 illustrates a vector processor in accordance with some embodiments.

FIG. 3 shows further details of a computer vision system architecture including a vector processor accordance with implementations of the present disclosure. A streaming hybrid architecture vector engine (SHAVE) processor 300 is disclosed, which in the illustrated embodiment is in communication with memory and circuitry components of the graphic processing system. The SHAVE processor 300 is a specialized graphics processor configured to carry out computer vision calculations in real time by means of various hardware logic further described herein. The components external to the processor 300 that are illustrated in FIG. 3 include a level 2 (L2) cache 350 providing fast-access memory resources, static RAM (SRAM) 354 for level 1 caching and longer-term memory, a stacked-die application-specific integrated circuit (ASIC) package 362, and a double data rate (DDR) controller 358 for interface between the ASIC and the memory components.

The processor 300 includes a number of hardware components which collectively facilitate a variable-length instruction system with, in the embodiment illustrated herein, eight functional units 302*a-h*. Each of the functional units 302*a-h* used in this implementation is further described below.

The functional units 302 have a variety of ports to different locations in memory both internal and external to the processor 300, based on the instructions associated with each functional unit and that unit's typical needs for these resources. Most particularly, in some implementations, the units 302 include ports to the two general-purpose registry files: the vector registry file (VRF) 304 or the integer registry file (IRF) 306.

The vector registry file 304 provides 512 bytes (32×128-bit words) of fast access, general purpose storage. It supports up to six read and six write accesses in parallel through a set of ports, which are allocated to variables in differing unit instructions. This may restrict certain operations from being conducted in parallel if two functional units carrying out different instructions are assigned to the same port.

Similarly, the integer registry file 306 provides 128 bytes (32×32-bit words) of fast access, general purpose storage. It supports up to twelve read and six write accesses in parallel through a set of ports, which are allocated to the functional units; this also limits the ability of certain instructions from being carried out in parallel.

One of ordinary skill will recognize that the size and configuration of each of the registry files 304, 306, along with the available access-ports, may be customized and that the values given herein are exemplary. For example, in another implementation, three registry files might be used rather than two. The number and priority of the access ports may similarly be selected by one of skill in the art.

A brief summary of each of the eight functional units is now given along with a description of the ports that the memory accesses and one or more examples of relevant functions. Although the embodiments discussed herein use these eight functional units, it will be understood that more or fewer functional units could be implemented in accordance with aspects of the present disclosure.

Predication Evaluation Unit (PEU) 302*a* includes logic for evaluating conditional commands with logical predicates, such as "if, then, else" commands. PEU instructions generally include a comparative instruction (CMU) for the antecedent and one or more other instruction (VAU, SAU, IAU, BRU, etc.) for the predicate. The PEU itself isn't allocated any read or write ports for the registry files.

Branch Unit (BRU) 302*b* includes various instructions for jumping to a different part of the instructions, looping instructions, and repeating the last instruction. The BRU is allocated two read ports and one write port for the IRF, which are primarily used for addresses associated with the branching instructions.

Load-Store Unit 0 and 1 (LSU0 and LSU1) 302*c* and 302*d* each include various instructions for loading data to and from memory. Various particular operations such as immediate load, displacement load, indexed load and store are carried out under the LSU functional unit. The LSU functional unit also includes multiple commands which allow for in-line swizzle of vector elements as further described below. Each of LSU0 and LSU1 includes access to three read ports and two write ports for the IRF, and one read port and one write port for the VRF. Additionally, each of the LSU0 and LSU1 includes access to a read and write port associated with the SRAM 354.

Integer Arithmetic Unit (IAU) 302*e* includes instructions for carrying out arithmetic operations treating bits as integers. The IAU is allocated three read ports and one write port for the IRF, which allows it to read up to three values for carrying out integer arithmetic and write the integer result.

Scalar Arithmetic Unit (SAU) 302*f* includes instructions for carrying out arithmetic operations (such as addition, subtraction, and scalar multiplication) that give a 32-bit result, which may be read as a single 32-bit value, two 16-bit values, or four 8-bit values as necessary. The SAU includes vector summation operations that result in a scalar value. SAU operations accommodate a variety of formats for values, including in some implementations, floating point and fixed point decimal, integer, and scaled integer. The SAU is allocated two read ports and one write port for the IRF. It is also allocated one read port for the VRF to accommodate scalar operations on a vector value.

Vector Arithmetic Unit (VAU) 302*g* includes instructions for carrying out operations that result in a vector, up to four 32-bit results. The four 32-bit regions can be read as a 4-vector of 32-bit elements, an 8-vector of 16-bit elements, or even a 16-vector of 8-bit elements. The VAU operations include a variety of standard matrix operators typically used in visual processing, such as cross-multiplication, element averaging, functions with enforced saturation points. The VAU is allocated two read ports and one write port for the VRF.

Compare Unit (CMU) 302*h* includes instructions for carrying out comparative operations, such as equivalence relations and other tests (greater than, less than, equals, data type comparison, etc). CMU also performs data type format conversion and can move data between the IRF and the VRF. The CMU instructions are often used in conjunction with PEU instructions in order to generate code for different contingencies, the "if/then" instructions relying on the result of one or more CMU tests in order to determine whether to proceed with the contingent instruction. The CMU is allocated three read ports and two write ports for the IRF, as well as four read and four write ports for the VRF. This allows the CMU to carry out comparison operations on any value registered by the system, including 16-element vector comparisons.

Altogether, the eight functional units allow for variable-length processor instructions of as many as 192 bits. Each processor instruction is a variable-length binary string that includes an instruction header and between zero and eight unit instructions.

The instruction header provides sufficient information to determine the total length of the processor instruction, including the bit length of each of the unit instructions that are to be performed in parallel as part of the processor instruction. This is carried out by limiting each of the functional units to at most three possible bit sizes (although other implementations may use longer headers to allow for additional different bit sizes).

Figure 4:
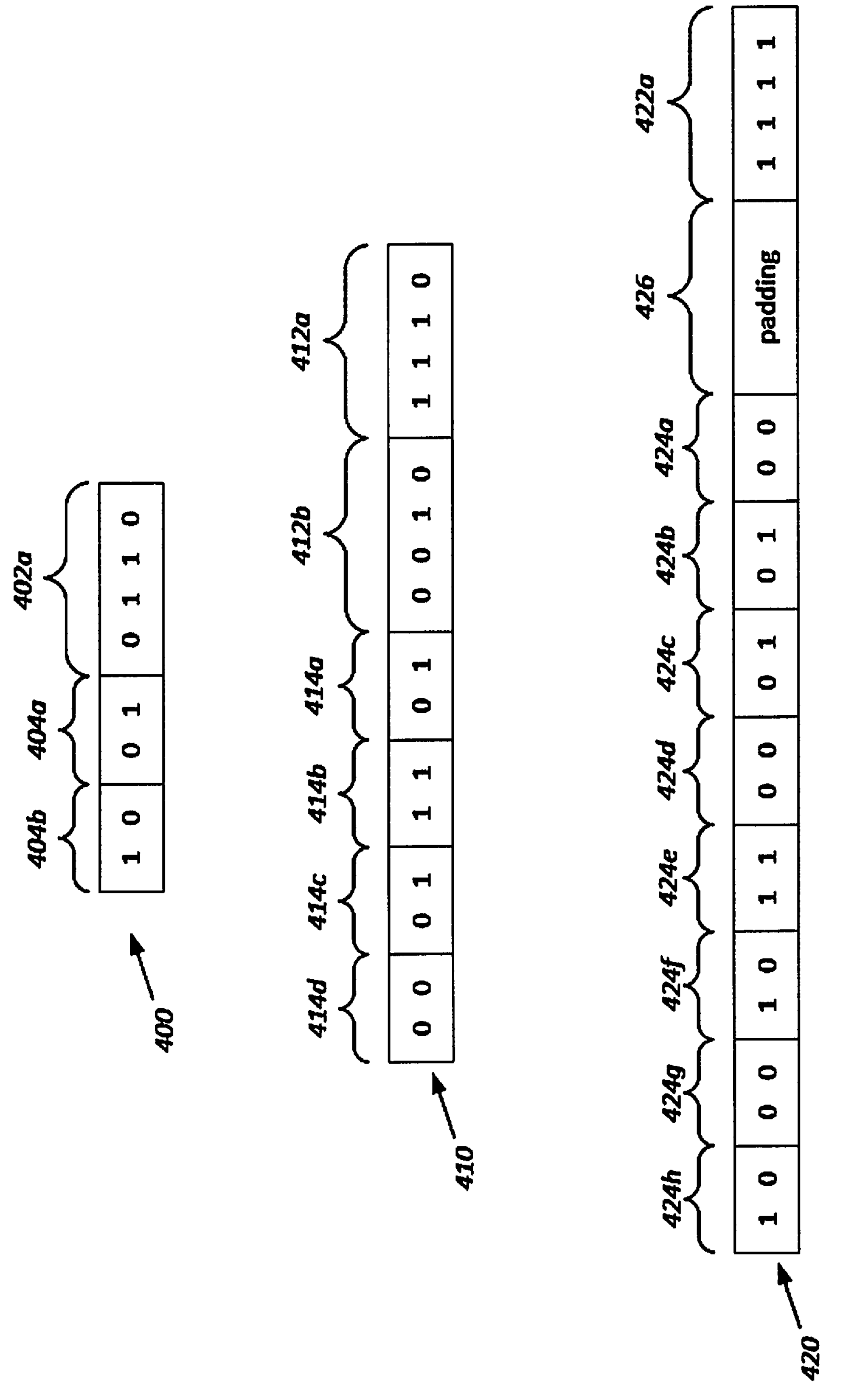
FIG. 4 maps three different variable-length instruction headers in accordance with some embodiments.

As an illustration, three processor headers 400, 410, and 420 are shown in FIG. 4. The first processor header 400 represents a header for two instructions being carried out in parallel, which is represented by the four leading bits of the header. The thirteen most common combinations of two headers found in parallel are given 4-bit codes, while one 4-bit code is reserved for a special instruction. The final two available 4-bit codes are the first four digits of longer 8-bit and 16-bit codes as described below.

The particular four-bit code 402*a* shown in the header 400 translates to CMU and IAU instructions. The next two bits represent the opcode 404*a* for the CMU instruction, which indicates its length and may also provide some information about which CMU instruction will be used. Similarly, the following two bits represent the opcode 404*b* for the IAU instruction. If either of the opcodes were 00, that would indicate that no instruction of the type is given as part of the processor instruction; this header could therefore also be selected to represent a single IAU instruction, for example, by placing 00 in the CMU opcode field 404*a*. In all, the header 400 is 8 bits long and provides sufficient information to determine the bit length of the entire processor instruction.

The instruction header 410 includes 8-bit code in the header which is used to identify up to four instructions to be carried out in parallel. A particular 4-bit word 412*a*, corresponding to "1110" in this implementation, is used for all of the four-instruction headers. Fifteen four-instruction combinations are assigned 4-bit codes which appear as the next 4 bits, shown as 412*b*. In this particular case, the code word 412*b* translates to VAU, CMU, LSU0, and IAU instructions respectively. The following 8 bits are opcodes 414*a-d* for each of the four instructions in order, and as shown, the IAU opcode 414*d* is set to 00, which means only VAU, CMU, and LSU0 instructions are actually represented by this header. The processor instruction header 410 is therefore 16 bits in this case, which is sufficient to identify the total length of the processor instruction as well as the identity and length of the individual unit instructions.

The instruction header 420 represents the residual case and the longest necessary header. This header 420 includes the 4-bit code which translates to including bits for the opcodes of all eight instructions—"1111" in this implementation. As above, any of the opcodes 424*a-h* may still be set to 00. In the header 420, only the CMU (224*b*), LSU0 (224*c*), SAU (224*e*), IAU (2240, and PEU (224*h*) instructions are indicated to actually be present, as the VAU (224*a*), LSU1 (224*d*), and BRU (224*g*) opcodes are set to 00.

In addition, a padding portion 426 may be added to the header 420 in some implementations. The instruction padding 426 may be variable-length and may be added so that the instruction ends at a 128-bit boundary of memory. An alignment process may control the length of the instruction padding 426.

Buffer Management

Figure 5:
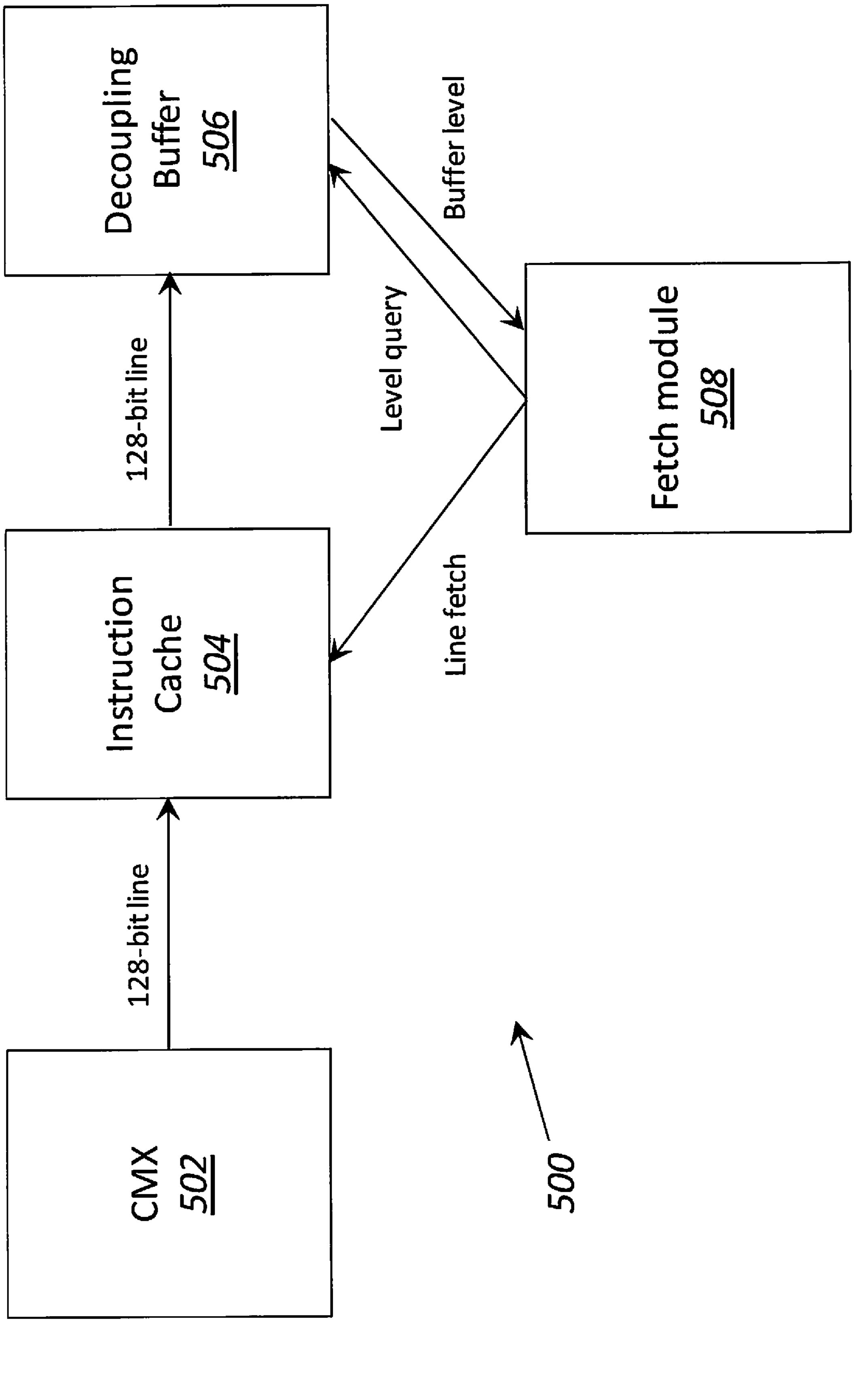
FIG. 5 is a block diagram illustrating a system for instruction buffer management in accordance with some embodiments.

FIG. 5 shows a diagram of a cache system 500 including a mechanism for fetching additional lines of data. Connection matrix memory 502 feeds data into an instruction cache 504 (which may be 2 kB) which in turn feeds lines of data to the instruction decoupling buffer 506. The instruction decoupling buffer 506 is fed with fixed-width lines on the memory side (128 bits in one implementation, although other sizes are possible), and provides the variable-width instructions on the processor side. A fetch module 508 monitors the level of the buffer 506 and determines when to signal for another 128-bit instruction line from the cache 504 to the buffer 506. Generally, this is carried out by means of a threshold; if the un-passed instructions in the decoupling buffer 506 exceed a certain level (either in instructions or number of bits), then the buffer 506 is considered to be satisfactorily full. When the buffer 506 drops below the threshold level, the fetch module 508 signals the instruction cache 504 for another 128-bits of data to be loaded in the buffer 506.

One reason not to overload the decoupling buffer 506 is the existence of discontinuities in the instructions, particularly jump instructions (given by BRU.JMP, an instruction in the Branching Unit). Filling the buffer full of instructions following a jump instruction is inefficient, as the jump instruction changes the memory location from which subsequent instructions should be pulled. Instructions subsequent to the jump instructions may therefore be discarded.

However, it is customary and desirable to include a limited number of instructions while the branching instruction is carried out; these are known as branch delay line instructions. The ideal number of branch delay instructions to include would be equal to the number of cycles of latency introduced by the branch instructions; for example, where a branch instruction introduces six cycles of latency, six cycles of instructions (ideally, six instructions) should be available in the buffer for processing. However, when instructions are variable-length, as is true with the processor instructions described herein, the number of branch delay instructions doesn't immediately translate into a number of bits that need to be included in the buffer.

Figure 6:
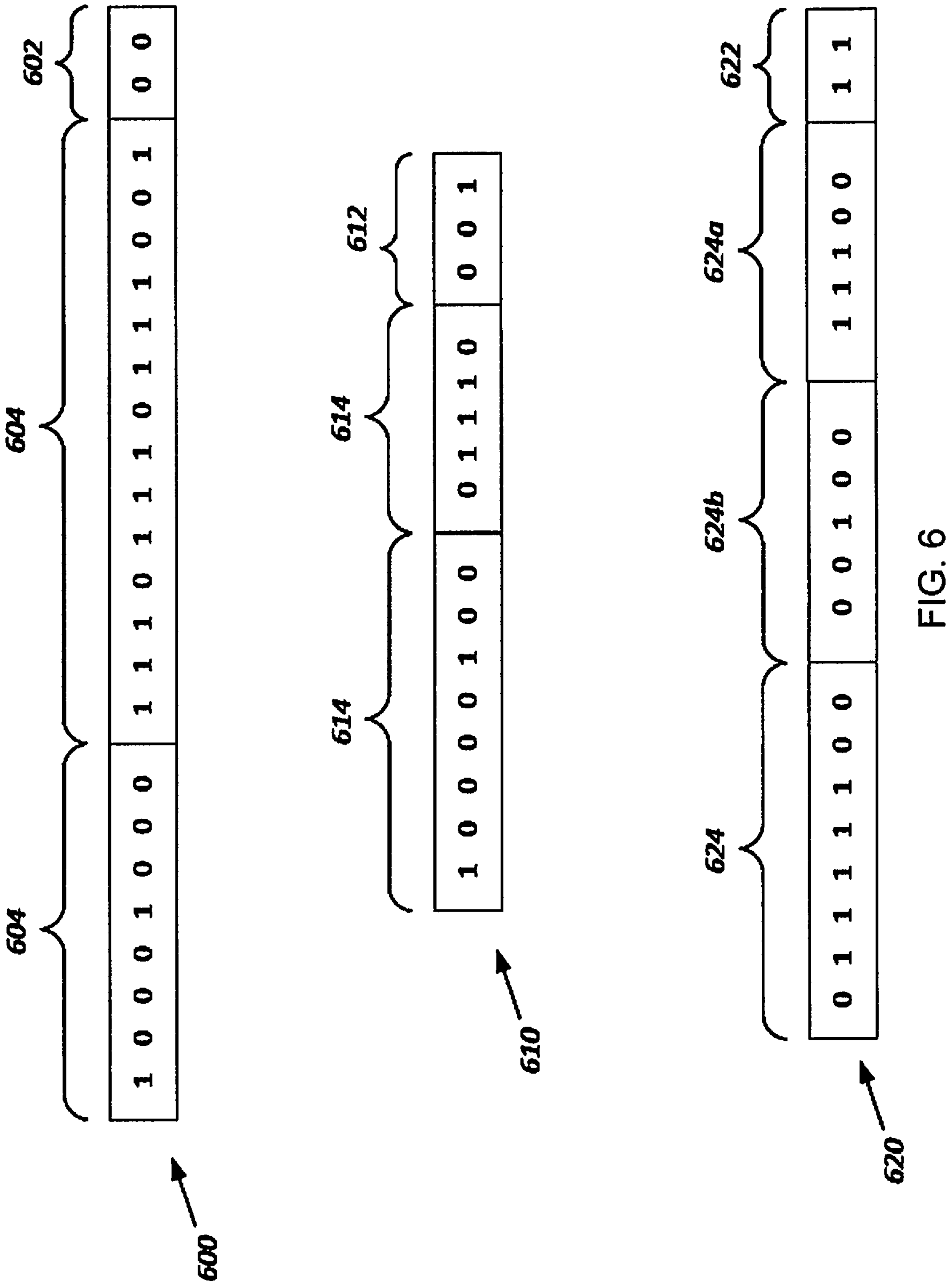
FIG. 6 maps three different functional unit instructions in accordance with some embodiments.

In order to improve buffer management for branching instructions, an additional field can be included in the bits of the branching instruction itself, as shown in FIG. 6. Certain select bit maps for BRU instructions are shown, including one each for the three sizes of BRU instructions given by the different BRU opcodes.

A BRU.BRA instruction 600 is shown, which from the instruction header is 24 bits. The particular instruction BRA, an instruction pointer-relative jump, is known by the use of the branching unit opcode 602 ("00" in this case). An immediate offset field 604 indicates the new position of the pointer within the instructions, and an 8-bit field 606 gives the total size of the delay instructions (in this case, 136 bits).

A BRU.JMP instruction 610 is shown, which from the instruction header is 16 bits. The particular instruction JMP, a register-indirect instruction pointer jump, is known by the use of the branching unit opcode 612 ("001" in this case). A five-digit field 614 indicates a new address within the integer registry file, and an 8-bit field 616 gives the total size of the delay instructions (in this case, 132 bits).

A BRU.RPL instruction 620 is shown, which from the instruction header is 20 bits. The particular instruction RPL, instructing the system to loop a block of instructions a variable number of times. This is known by the use of the branching unit opcode 622 ("11" in this case). The RPL instruction takes two five-digit arguments 624*a*, 624*b*, each of which represents an address in the integer registry file. The integer value found at the first listed registry location 624*a* indicates the number of times to loop the instruction. The integer value found at the second listed location 624*b* designates a loop end address. An 8-bit field 616 gives the total size of the delay instructions (in this case, 124 bits).

Figure 7:
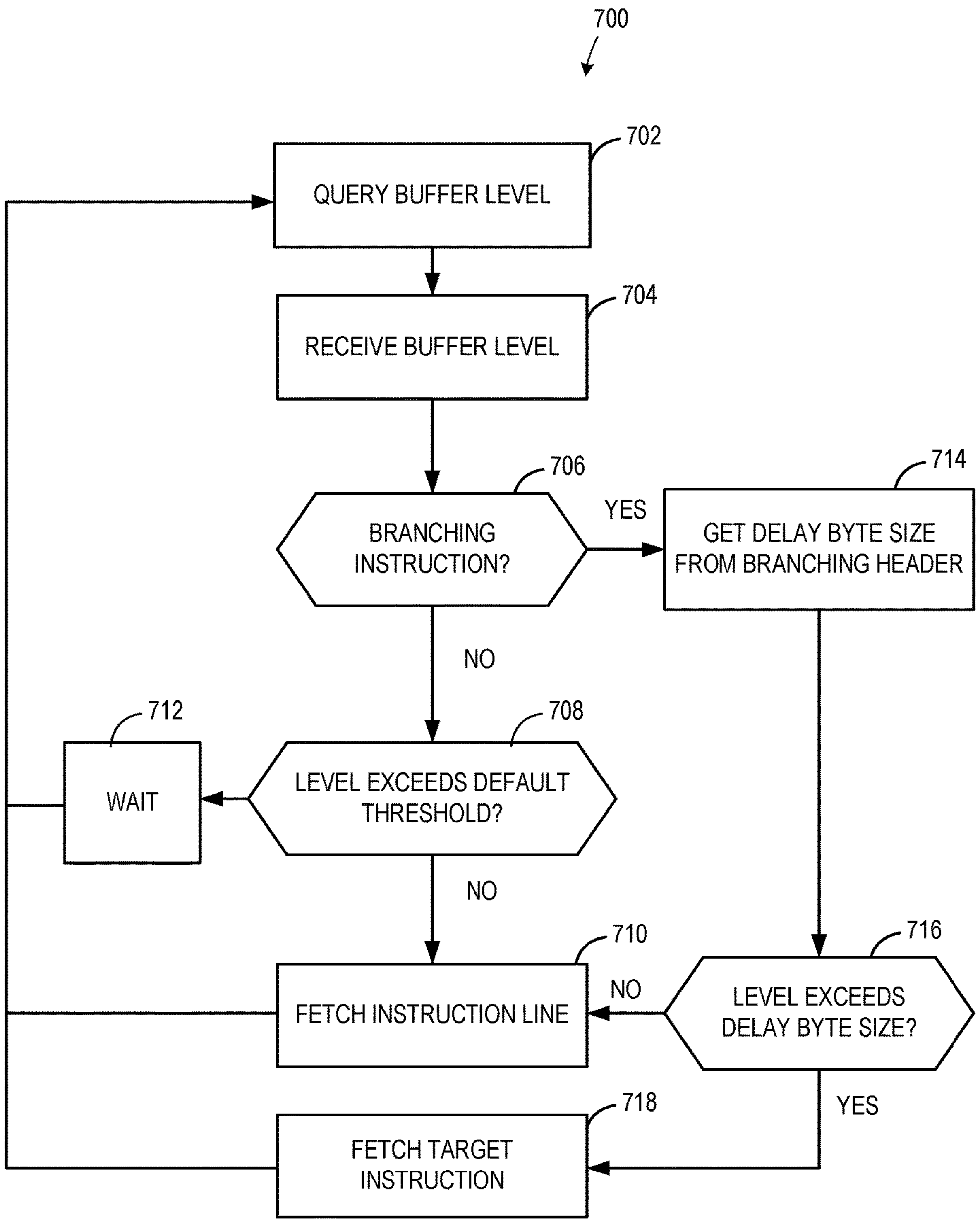
FIG. 7 is a flow chart illustrating a method for buffer management in accordance with some embodiments.

With the inclusion of a bit size field for branching instructions that introduce branch delay, it is possible for the fetch module to carry out an improved process for managing the buffer, as shown in FIG. 7.

The method 700 shown in FIG. 7 is one way that a buffer may be managed by means of a fetch module as described above. The fetch module may query the level of the buffer (702). In some implementations, the query may be executed by a source other than the fetch module, or the query may not be necessary at all (as when the buffer reports its level to the fetch module at intervals without prompting).

The fetch module receives information representing the level of data available in the buffer (704). Ideally this is expressed in bits or bytes of data, although it may also be expressed in instructions. In any event, the buffer represents instructions which have been pulled for the system to evaluate but have not yet been evaluated.

If no branching instruction has been interpreted ("no" branch of decision block 706), then a buffer level threshold is compared against a default value (708). The default value may be manually set by a user or may be arrived at through an automated process based on empirical measurements of system performance. If the buffer level exceeds the threshold, then the fetch module can wait an appropriate interval before again querying the buffer (712). Otherwise, another line of data (in some implementations, 128 bits) is fetched from the cache (710) and a further level query is performed.

If a branching instruction has been interpreted ("yes" branch of decision block 706) so that branch delay instructions should be interpreted while the system begins fetching instructions from a new spot in memory, then the byte size for the delay instructions are determined from the header of the branching instruction (714). The buffer level is then compared against this byte size threshold (716). If the buffer level exceeds the threshold, then the system fetches instructions from the branching destination (718). If the buffer level is below the byte size threshold, then another instruction line is fetched in order to provide sufficient branch delay instructions (710).

General-Use Hardware Operations

The eight functional units described herein are built onto a processor as shown and described above. In some implementations, instructions which include operations on one or more values in memory may be designed to use the same underlying logic regardless of the data type of the values. For example, in one implementation, the instructions disclosed herein are written into the hardware of the chip, and the same hardware and datapath may be used to operate on fixed point decimals, floating point decimals, integers, and U8F values. Furthermore, the same hardwired operation logic may be used to operate on 32-bit, 16-bit, and 8-bit values for any of these supported data types. In this way, the total footprint of the processor may be reduced as these logic components may be flexibly reused.

Figure 8:
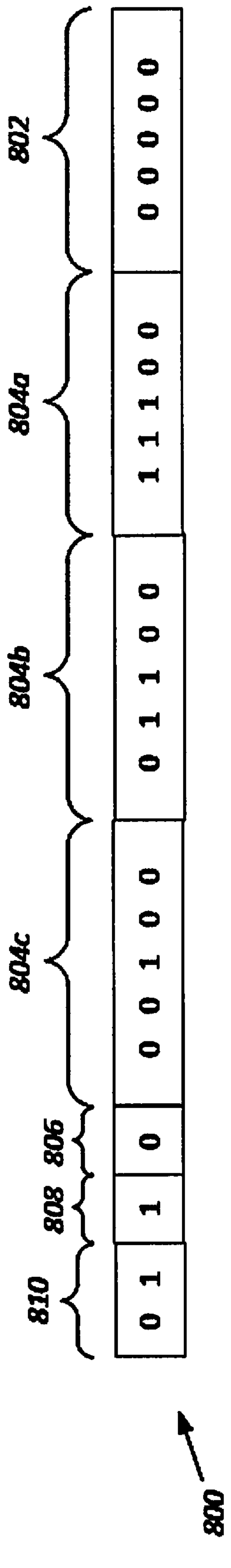
FIG. 8 maps a functional unit instruction in accordance with some embodiments.

As an example, FIG. 8 shows the bit map for a scalar arithmetic function, SAU.ADD, that can be set to accommodate multiple data types and multiple levels of precision. The instruction 800 includes a five-digit opcode 802 followed by three five-digit fields 804*a*, 804*b*, 804*c* each of which is a reference to a location in IRF memory. The ADD operation takes the value stored in the IRF location designated by 804*a* and the value stored in the IRF location designated by 804*c* and stores the result in the IRF location designated by 804*b*. A single bit 806 is included to allow the second operand location 804*c* to be identified as a pointed offset rather than an IRF location.

The remaining bits 808 and 810 accommodate different types and sizes. The bit 808 designated floating point with "1" and integer with "0," while the two size bits 810 designate 32-, 16-, or 8-bit. In this way, multiple data formats use the same operations in the same hardware logic.

Figure 9:
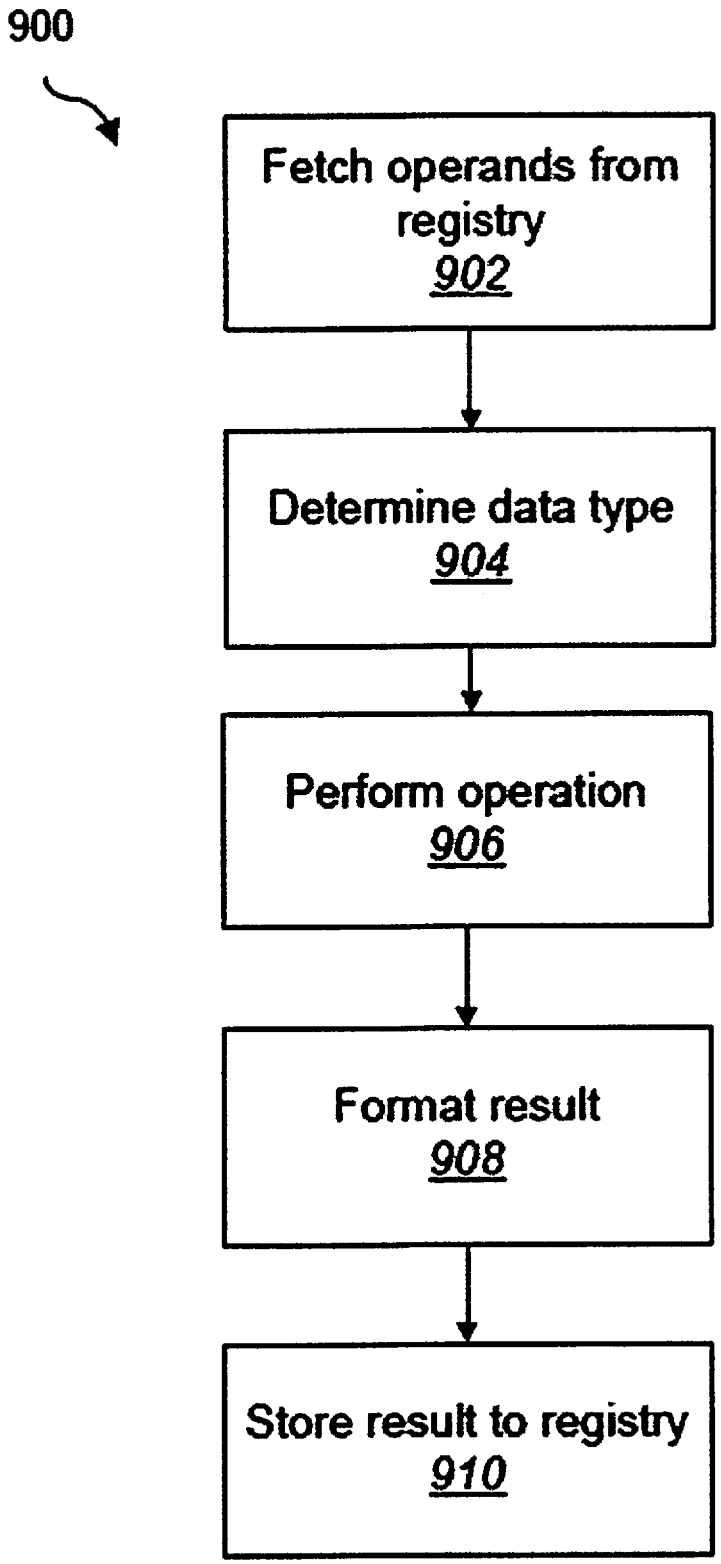
FIG. 9 is a flow chart illustrating a method for general-use hardware execution of an operation in accordance with some embodiments.

FIG. 9 represents a flowchart for a method 900 for carrying out an operation. Upon reading an instruction representing such an operation, the system fetches the values as designated from the appropriate registry file (1102).

The system determines the data type of the operands (1104). This may be clear from their storage in the registry or otherwise known to the system. Alternatively, the operation header may have one or more fields for identifying the data type.

The system performs the operation, getting a result (1106). The result is usually in the same format as the operands, but in some implementations a result may be formatted in a certain way and may need to be re-formatted to match the expected type of the result (1108). If the instructions so require, the result may be stored to the registry (1110) or may be held in cache or temporary memory for immediate use.

Condensed Look-Up Table

For efficient processing of certain data, it is appropriate to include a lookup table for commonly used functions. However, particular functions within particular data types can be more efficiently stored in memory using a compression scheme that is tailored to the values found in the particular table.

For example, the base-2 logarithm for 16-bit floating point values typically includes a table for values between 0 and 1, and a large fraction of that table includes a significant number of repetitions of the leading bit of the fractional part of the value. FIG. 10 is a chart which shows how the first five bits of the look-up table may be used to encode up to fifteen repetitions of the leading bit. Rather than encoding the first five places of the value after the decimal, these five digits instead represent the leading digit after the decimal and the number of times that digit is repeated before the opposite digit appears. The patterns "111 . . . 10" and "000 . . . 01" are thus replaced with the encoded five bits for up to fifteen repetitions of the leading digit.

Figure 11:
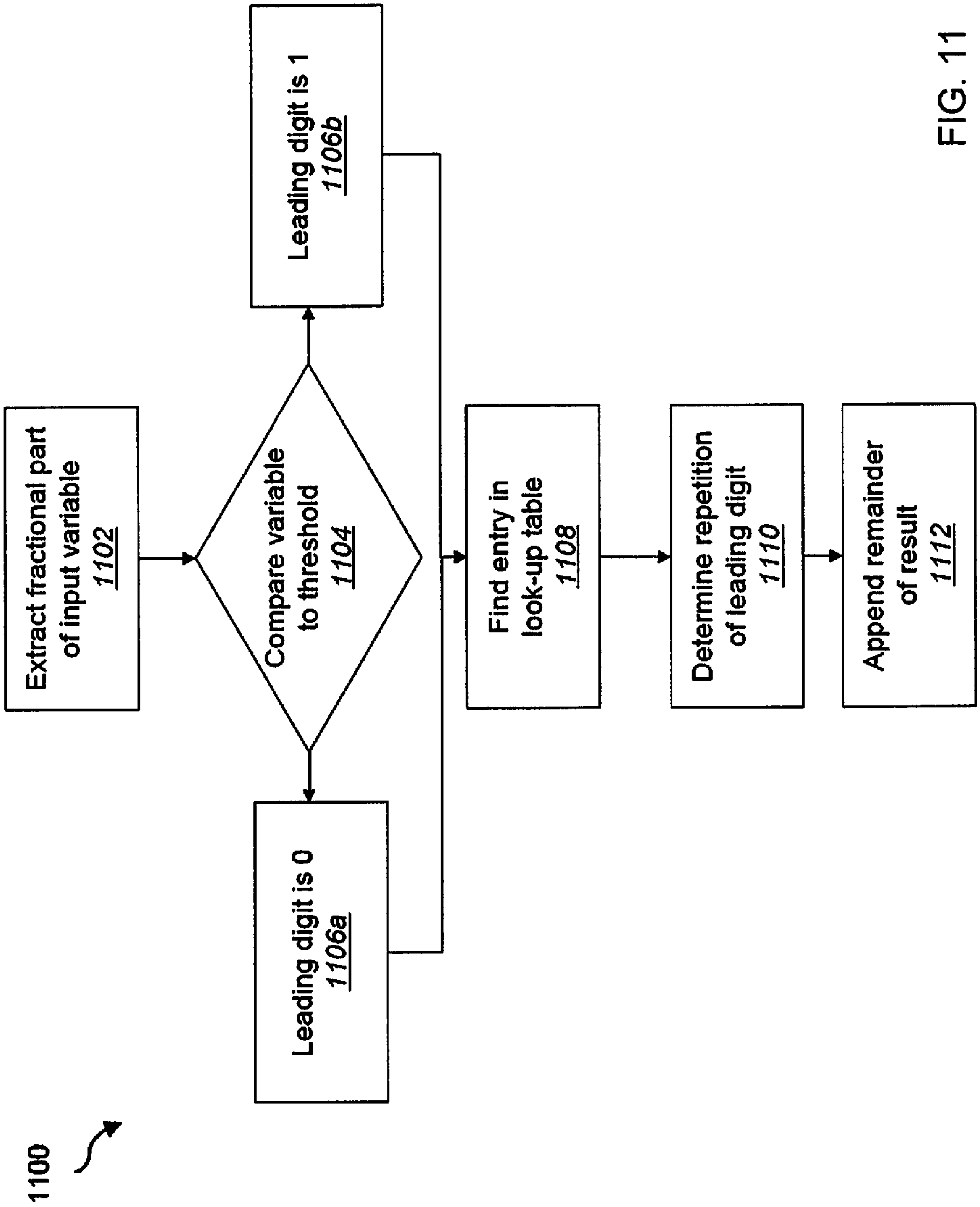
FIG. 11 is a flow chart illustrating a method for using a compressed look-up table in accordance with some embodiments.

FIG. 11 represents a flowchart for translating a look-up table into the fractional part of a floating point decimal for a log-2 operation. Here, a single input variable is to be converted into a result value in log base 2, and uses an identified threshold so as to only require four encoded bits instead of five.

The system extracts the fractional part of the input variable (1102). The fractional part is then compared against a threshold value (1104) to determine whether it's an entry with a leading 0 or a leading 1 (1106*a* or 1106*b*). The appropriate entry is then found in the look-up table (1108), and the appropriate number of repetitions of the leading digit is found according to the first four bits of the entry (1110). The remaining bits of the entry are appended as the remainder of the result (1112).

This condensed look-up table may, in some implementations, save as much as 40% of the space needed for a standard worst-case look-up table.

In-Line Swizzle

Carrying out multiple functional unit instructions in parallel allows for certain operations common to visual processing to be carried out more efficiently in-line. For example, certain common operations in visual processing involve exchanging two or more of the elements in a vector (commonly known as "swizzling"), replacing particular vector elements with a 1 or 0, and inverting one or more elements. As a particular example, vector inverses are often part of visual processing operations, which involve both transposition (swizzling) and inversion. However, it is often not desirable that the vector elements in memory actually be changed; the altered vector is needed for a particular operation but the original vector is used thereafter.

In some implementations, the system may include support for in-line swizzling, inverting, and substitution for vector elements which occurs within the primary datapath and without disturbing the underlying values in memory.

Figure 12:
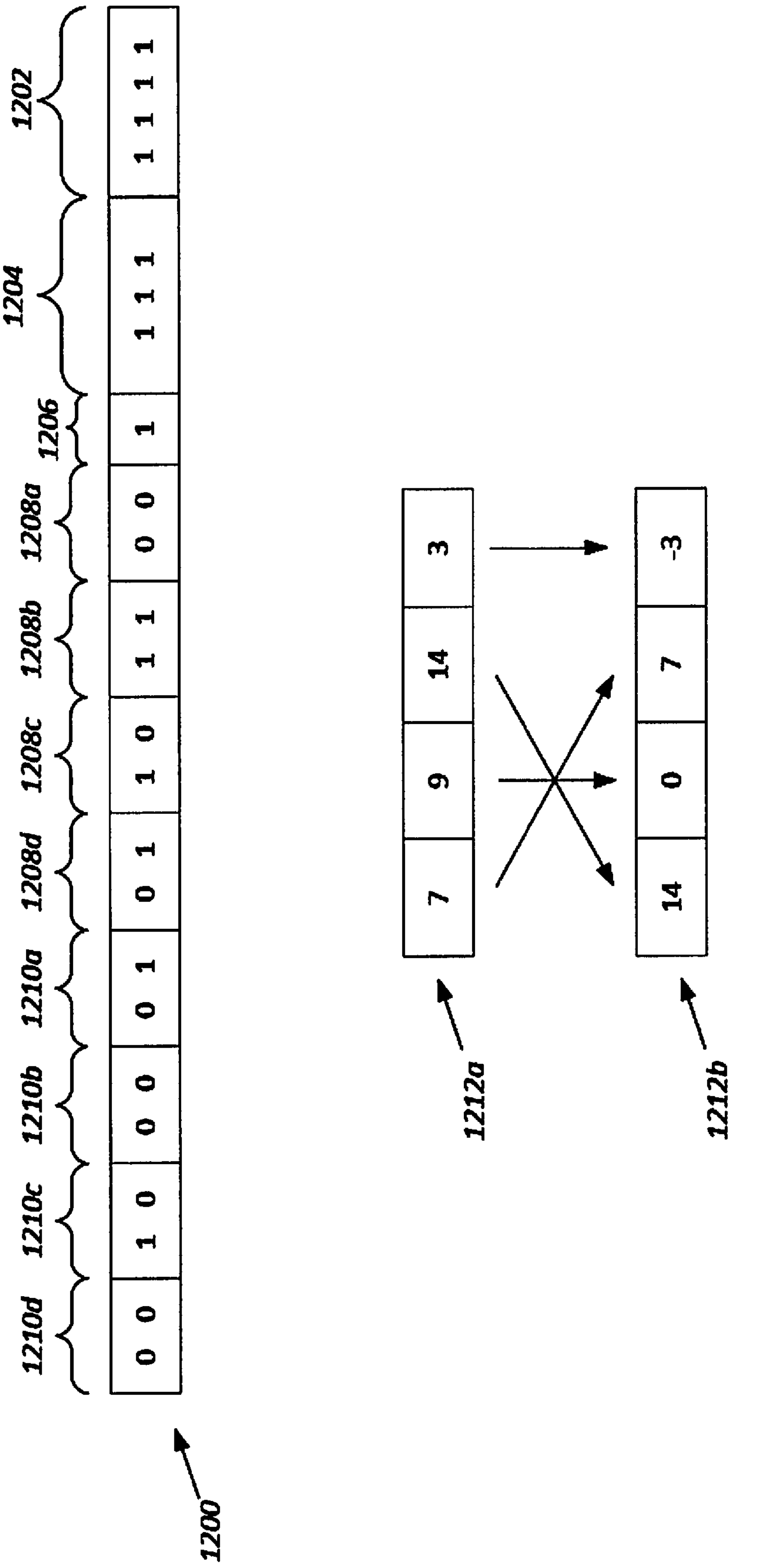
FIG. 12 maps a swizzle instruction and illustrates the instruction on a vector.

FIG. 12 is a bit map for a load-store functional operator, LSU.SWZM4, which provides in-line swizzle with optional substitution and inversion for a four-element vector being used as the first operand in VAU, CMU, or SAU function with VRF input. Following the opcode 1202 to identify the function, a unit field 1204, and a bit 1206 that allows the function to be used for byte rather than word swizzle, the instruction includes four fields 1208*a-d* which designate which of the four elements is to appear in each of the four slots, plus four fields 1210*a-d* which are used to mark substitution or inversion.

The swizzling operation is illustrated by means of original vector 1212*a* and in-line swizzled vector 1212*b*. From the fields 1208*a-d*, the first and third elements keep their spots while the second and fourth swap places. From the fields 1210*a-d*, the second and fourth elements are reproduced according to their swizzled positions (code "00"), the first element is inverted (code "01"), and the third element is replaced with a zero (code "10"). The resulting vector 1212*b* is used in place of the original vector 1212*a* in a particular unit instruction that includes the LSU.SWZM4 in-line swizzling operation, but the original vector 1212*a* is not itself altered or replaced in memory.

Figure 13:
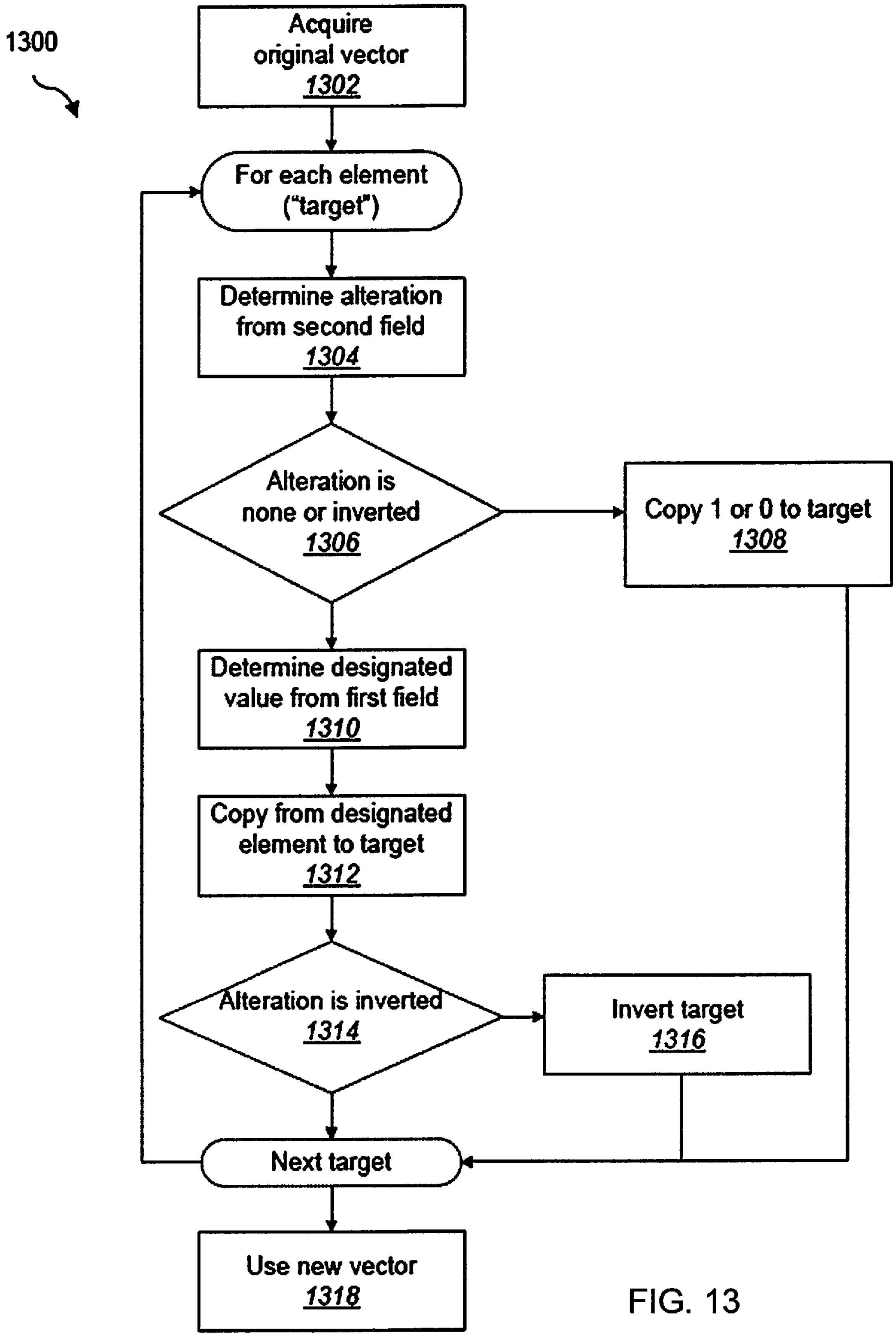
FIG. 13 is a flow chart illustrating a method for in-line vector alteration in accordance with some embodiments.

FIG. 13 illustrates an exemplary in-line method 1300 for swizzling and altering a vector in accordance with the disclosure and, in this particular implementation, based on the first and second fields for each element described above with respect to the LSU.SWZM4 operation. The original vector is acquired (1302), and certain steps are carried out for each of the elements of the vector (which is the "target" element while the steps are performed on that element).

Based on the value for the target element in the second field (1304), the system either substitutes a 1 or 0 to the target element (1308) or identifies and copies the designated element value to the target element (1310, 1312). If the former (substitution of 1 or 0), then the system is data-type aware: that is, the 1 or 0 value is formatted according to the data type of the vector elements (such as floating point, fixed point, integer, or scaled integer). If the latter (none or inverted), a further step determines whether to invert the target (1314, 1316), at which point the system goes on to altering the next element.

Once every element in the vector is switched and/or altered as specified, the new vector is used by the appropriate operation (1318). The original vector is not overwritten by the swizzled vector but is instead only used as an argument in whatever function or functions are called in the particular instruction.

Figure 14:
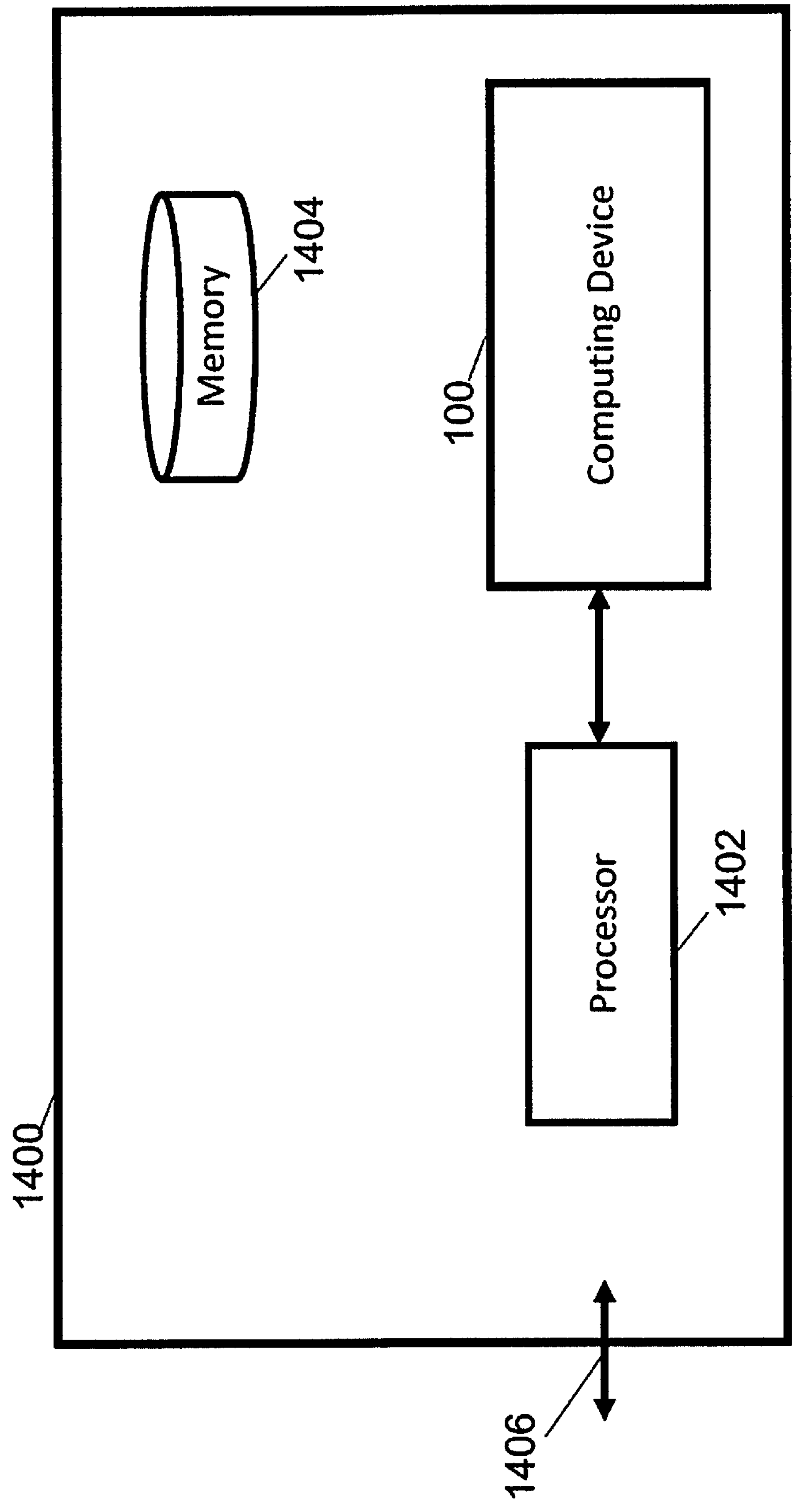
FIG. 14 illustrates an electronic device that includes the computing device in accordance with some embodiments.

In some embodiments, the parallel computing device 100 can reside in an electronic device. FIG. 14 illustrates an electronic device that includes the computing device in accordance with some embodiments. The electronic device 1400 can include a processor 1402, memory 1404, one or more interfaces 1406, and the computing device 100.

The electronic device 1400 can have memory 1404 such as a computer readable medium, flash memory, a magnetic disk drive, an optical drive, a programmable read-only memory (PROM), and/or a read-only memory (ROM). The electronic device 1400 can be configured with one or more processors 1402 that process instructions and run software that may be stored in memory 1404. The processor 1402 can also communicate with the memory 1404 and interfaces 1406 to communicate with other devices. The processor 1402 can be any applicable processor such as a system-on-a-chip that combines a CPU, an application processor, and flash memory, or a reduced instruction set computing (RISC) processor.

The memory 1404 can be a non-transitory computer readable medium, flash memory, a magnetic disk drive, an optical drive, a programmable read-only memory (PROM), a read-only memory (ROM), or any other memory or combination of memories. The software can run on a processor capable of executing computer instructions or computer code. The processor might also be implemented in hardware using an application specific integrated circuit (ASIC), programmable logic array (PLA), field programmable gate array (FPGA), or any other integrated circuit.

The interfaces 1406 can be implemented in hardware or software. The interfaces 1406 can be used to receive both data and control information from the network as well as local sources, such as a remote control to a television. The electronic device can also provide a variety of user interfaces such as a keyboard, a touch screen, a trackball, a touch pad, and/or a mouse. The electronic device may also include speakers and a display device in some embodiments.

In some embodiments, a processing unit, such as a vector processor 102 and a hardware accelerator 104, in the computing device 100 can include an integrated chip capable of executing computer instructions or computer code. The processor might also be implemented in hardware using an application specific integrated circuit (ASIC), programmable logic array (PLA), field programmable gate array (FPGA), or any other integrated circuit.

In some embodiments, the computing device 100 can be implemented as a system on chip (SOC). In other embodiments, one or more blocks in the parallel computing device can be implemented as a separate chip, and the parallel computing device can be packaged in a system in package (SIP). In some embodiments, the parallel computing device 400 can be used for data processing applications. The data processing applications can include image processing applications and/or video processing applications. The image processing applications can include an image processing process, including an image filtering operation; the video processing applications can include a video decoding operation, a video encoding operation, a video analysis operation for detecting motion or objects in videos. Additional applications of the present invention include machine learning and classification based on sequence of images, objects or video and augmented reality applications including those where a gaming application extracts geometry from multiple camera views including depth enabled cameras, and extracts features from the multiple views from which wireframe geometry (for instance via a point-cloud) can be extracted for subsequent vertex shading by a GPU.

The electronic device 1400 can include a mobile device, such as a cellular phone. The mobile device can communicate with a plurality of radio access networks using a plurality of access technologies and with wired communications networks. The mobile device can be a smart phone offering advanced capabilities such as word processing, web browsing, gaming, e-book capabilities, an operating system, and a full keyboard. The mobile device may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile device may have the capability to run applications or communicate with applications that are provided by servers in the communications network. The mobile device can receive updates and other information from these applications on the network.

The electronic device 1400 can also encompasses many other devices such as televisions (TVs), video projectors, set-top boxes or set-top units, digital video recorders (DVR), computers, netbooks, laptops, tablet computers, and any other audio/visual equipment that can communicate with a network. The electronic device can also keep global positioning coordinates, profile information, or other location information in its stack or memory.

It will be appreciated that whilst several different arrangements have been described herein, that the features of each may be advantageously combined together in a variety of forms to achieve advantage.

In the foregoing specification, the application has been described with reference to specific examples. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An apparatus comprising:

at least one memory including computer readable instructions; and at least one processor to execute the instructions to at least:

store, in a look-up table, entries corresponding to fractional results for an operation performed on respective input values, the fractional results having a first level of precision, the entries of the look-up table including a plurality of encoded bits and a plurality of unencoded bits;

in response to a first one of the instructions including the operation, look up a first entry in the look-up table corresponding to a first input value;

decode the plurality of encoded bits for the first entry to generate a part of the fractional result corresponding to the first entry;

add at least the plurality of unencoded bits for the first entry to the part of the fractional result to complete generation of the fractional result corresponding to the first entry; and return an output of the operation based on the generated fractional result.

2. The apparatus of claim 1, wherein the operation is a unitary operation.

3. The apparatus of claim 1, wherein the operation is a logarithmic operation.

4. The apparatus of claim 1, wherein the encoded bits represent a number of times to repeat a first digit when generating the fractional result corresponding to first entry.

5. The apparatus of claim 4, wherein the first digit is also stored in the first entry of the look-up table.

6. The apparatus of claim 4, wherein the first digit is not stored in the first entry of the look-up table.

7. The apparatus of claim 4, wherein the at least one processor is further to compare the first input value to a threshold value to determine the first digit.

8. At least one computer readable memory implemented by at least one of a flash memory, a magnetic disk drive, an optical drive or a read-only memory, the at least one computer readable memory comprising computer readable instructions that, when executed by at least one processor, cause the at least one processor to at least:

store, in a look-up table, entries corresponding to fractional results for an operation performed on respective input values, the fractional results having a first level of precision, the entries of the look-up table including a plurality of encoded bits and a plurality of unencoded bits;

in response to a first one of the instructions including the operation, look up a first entry in the look-up table corresponding to a first input value;

decode the plurality of encoded bits for the first entry to generate a part of the fractional result corresponding to the first entry;

add at least the plurality of unencoded bits for the first entry to the part of the fractional result to complete generation of the fractional result corresponding to the first entry; and return an output result of the operation based on the generated fractional result corresponding to first entry.

9. The at least one computer readable memory of claim 8, wherein the operation is a unitary operation.

10. The at least one computer readable memory of claim 8, wherein the operation is a logarithmic operation.

11. The at least one computer readable memory of claim 8, wherein the encoded bits represent a number of times to repeat a first digit when generating the fractional result corresponding to first entry.

12. The at least one computer readable memory of claim 11, wherein the first digit is also stored in the first entry of the look-up table.

13. The at least one computer readable memory of claim 11, wherein the first digit is not stored in the first entry of the look-up table.

14. The at least one computer readable memory of claim 11, wherein the instructions, when executed, cause the at least one processor to compare the first input value to a threshold value to determine the first digit.

15. A method comprising:

storing, in a look-up table, entries corresponding to fractional results for an operation performed on respective input values, the fractional results having a first level of precision, the entries of the look-up table including a plurality of encoded bits and a plurality of unencoded bits;

in response to a first one of the instructions including the operation, looking up a first entry in the look-up table corresponding to a first input value;

decoding, by executing an instruction with at least one processor, the plurality of encoded bits for the first entry to generate a part of the fractional result corresponding to the first entry;

adding, by executing an instruction with the at least one processor, at least the plurality of unencoded bits for the first entry to the part of the fractional result to complete generation of the fractional result corresponding to the first entry; and returning an output result of the operation based on the generated fractional result corresponding to first entry.

16. The method of claim 15, wherein the operation is a unitary operation.

17. The method of claim 15, wherein the operation is a logarithmic operation.

18. The method of claim 15, wherein the encoded bits represent a number of times to repeat a first digit when generating the fractional result corresponding to first entry.

19. The method of claim 18, wherein the first digit is also stored in the first entry of the look-up table.

20. The method of claim 18, wherein the first digit is not stored in the first entry of the look-up table.

21. The method of claim 18, further including comparing the first input value to a threshold value to determine the first digit.

22. The at least one computer readable memory of claim 8, wherein the at least one computer readable memory is implemented by a combination of computer readable memories including (i) a first one or more flash memories, a first one or more magnetic disk drives, a first one or more optical drives or a first one or more read-only memories and (ii) a second one or more flash memories, a second one or more magnetic disk drives, a second one or more optical drives or a second one or more read-only memories.

* * * * *